United States Patent [19]

Erbstein et al.

[11] 4,346,446
[45] Aug. 24, 1982

[54] MANAGEMENT AND ANALYSIS SYSTEM FOR WEB MACHINES AND THE LIKE

[75] Inventors: Robert S. Erbstein; Gary R. Richard, both of New London County, Conn.; Roland T. Palmatier, Washington County, R.I.; Robert W. McGill, Hilversum, Netherlands

[73] Assignee: Harris Corporation, Melbourne, Fla.

[21] Appl. No.: 133,770

[22] Filed: Mar. 25, 1980

[51] Int. Cl.³ .............................................. G06F 15/46
[52] U.S. Cl. ..................................... 364/551; 364/469; 101/365
[58] Field of Search ............... 364/551, 498, 468, 900, 364/518, 523; 101/365

[56] References Cited

U.S. PATENT DOCUMENTS

| | | | |
|---|---|---|---|
| 3,930,145 | 12/1975 | Fort et al. | 364/421 |
| 3,946,211 | 3/1976 | Nakao et al. | 364/107 X |
| 4,001,785 | 1/1977 | Miyazaki et al. | 364/554 X |
| 4,089,056 | 5/1978 | Barna et al. | 364/551 |
| 4,195,338 | 3/1980 | Freeman | 364/523 X |

FOREIGN PATENT DOCUMENTS 2024457 1/1980 United Kingdom ................ 101/365

Primary Examiner—Edward J. Wise
Attorney, Agent, or Firm—Biebel, French & Nauman

[57] ABSTRACT

A press management and analysis system, embodies a press console (PMA), one for each press, which is located adjacent the press, and communicating with a remote entry computer (REC). The PMA monitors sensor devices on the press, to follow press operation from the beginning of a job assignment through makeready operations and printing operations to completion.

A REC console remote from the press room, as in the production manager's office, communicates with each PMA, and recording (filing), hard copy printing, and like functions are handled at the REC console. The system provides displays requiring completion by the pressman/operator (or manager) thus soliciting information as well as informing all concerned of job progress, of standard times expected for a job, and of transfer from one mode or phase of the job, as from makeready time to run time in which good product is printed. The system feeds back and records event messages, and encourages operator input and identification of stoppage reasons, etc.

The system also retains coefficients used along with input job data, to calculate standard times for a job of given magnitude. The results of such calculations appear in appropriate displays as standards against which actual times are compared, and to emphasize when projected or actual time exceeds calculated standard time. All filed information is available for management analysis of press operation as reports compiling desired data and all information may also be communicated to a host computer for storage and/or further analysis.

30 Claims, 22 Drawing Figures

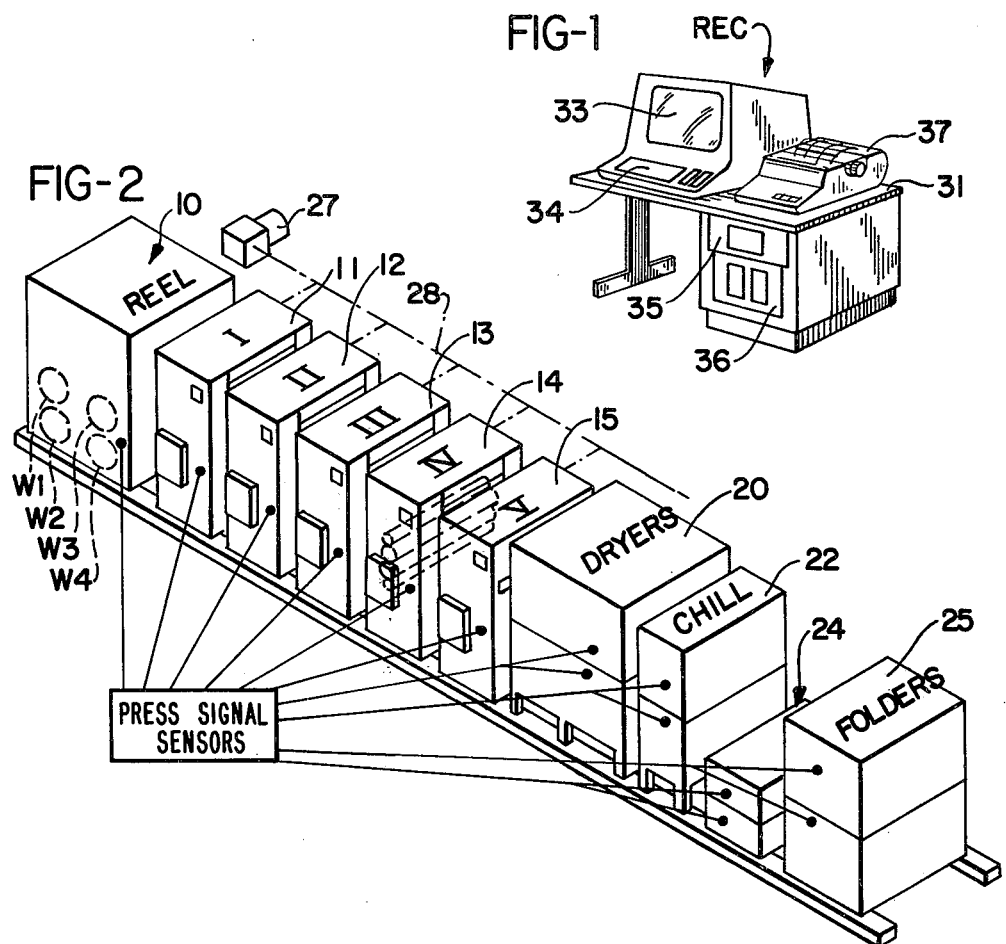
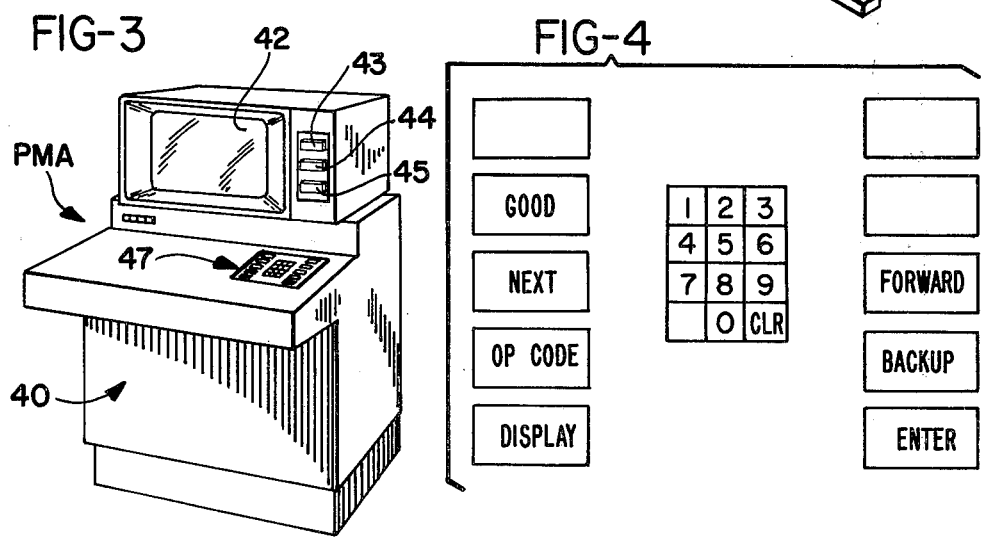

FIG-10

CREW DATA

| | POSITION | NUMBER | TIME ON | TIME OFF |
|---|---|---|---|---|
| 1 | 1ST PRESSMAN | -- -- -- -- | --:-- | --:-- |
| 2 | 2ND PRESSMAN | -- -- -- -- | --:-- | --:-- |
| 3 | ROLL TENDER | -- -- -- -- | --:-- | --:-- |
| 4 | FOLDER TENDER | -- -- -- -- | --:-- | --:-- |
| 5 | JOGGER 1 | -- -- -- -- | --:-- | --:-- |
| 6 | JOGGER 2 | -- -- -- -- | --:-- | --:-- |
| 7 | — CREW HELD OVER | | | |

FIG-11

```
                    MAKEREADY STARTUP
RUN TYPE: 3 0 0     JOB: 1 2 3      FORM: 4 5 6       RUN: 7 8

WEB 1 MILL:__   PAPER TYPE:__   WIDTH:_._._    BASIS WT:__   COLOR:_/C
WEB 2 MILL:__   PAPER TYPE:__   WIDTH:_._._    BASIS WT:__   COLOR:_/C
WEB 3 MILL:__   PAPER TYPE:__   WIDTH:_._._    BASIS WT:__   COLOR:_/C

UNITS:_                         PLATES:__      FOLDER:_/_ DEL _/_S _UP
QUANITY:_._._._._                QUALITY:_                  _/_S _UP

ENTRIES COMPLETE ?:_

SUBSEQUENT MAKEREADY ACTIVITIES

PREP AND WASHUP      NO. OF UNITS :_
   WASH BLANKETS        NO. OF UNITS :_
   CHANGE PLATES        NO. OF PLATES:_
   CLEAN CYLINDERS      NO. OF UNITS :_
   LEADWEBS             NO. OF WEBS  :_
```

FIG-12

RUN TYPE: 3 0 0      JOB: 1 2 3   MAKEREADY   FORM: 4 5 6      RUN: 7 8

```
                      1    2    3    4    5    6    7    8
STANDARD MKRDY HRS:  ▨▨▨▨▨▨▨
PROJECTED MKRDY HRS: ▨▨▨▨▨▨▨▨▨

ACCUM MKRDY HRS:
      DOWNTIME:
      WAITTIME:
      PM TIME:

STAND MKRDY WASTE:
ACCUMULATED WASTE:
```

DOWNTIME OP CODES

__  __  __  __  __  __
__  __  __  __  __  __

WAITTIME OP CODE

__  __

PM OP CODE

RUN TYPE: 3 0 0    JOB: 1 2 3    MAKEREADY    FORM: 4 5 6    RUN: 7 8

STANDARD MKRDY HRS:
PROJECTED MKRDY HRS:

ACCUM MKRDY HRS:
DOWNTIME:
WAITIME:
PM TIME:

STAND MKRDY WASTE:
ACCUMULATED WASTE:

DOWNTIME OP CODES
_ _ _ _ _ _
_ _ _ _ _ _

WAITTIME OP CODE
_ _ _

PM OP CODE
_ _ _

FIG-16

RUN TYPE: 3 0 0    JOB: 1 2 3  RUN STATUS    FORM: 4 5 6    RUN: 7 8

STANDARD RUN HOURS :
PROJECTED RUN HOURS :

RUN HOURS :
DOWNTIME HOURS :
WAITTIME HOURS :
PM TIME HOURS :

STANDARD RUN WASTE :
ACCUM RUN WASTE :

STANDARD IMPRES/HR :
ACCUM IMPRES/HR :

DOWNTIME OP CODES
_ _ _ _    _ _
_ _ _ _    _ _
_ _ _ _    _ _

WAITTIME OP CODE
_ _ _    _ _

PM OP CODE
_ _ _    _ _

FIG-19

OP CODE PHRASES, PAGE ONE

ADMINISTRATIVE
100 SET TIME
111 CLEAR ALERTS
121 TERM DOWN TIME
122 TERM WAIT TIME
123 TERM PM TIME
200 COLOR OK INTERN
210 COLOR OK CUSTOM

ORIGINAL MAKEREADY
300 ORIGINAL MKRDY
301 CUSTOMER CORRECT
302 PLATE ERROR
304 FOLDER ADJUST
309 STRIP AND CLEAN

SUB MAKEREADY
310 LOT CHANGE
311 PLATE ERROR
312 CHANGE STOCK
321 CUST CORRECT

ADDITIONAL MAKEREADY
323 LIFTED FORM

BAD START-PLATE ERROR

349 PLATE ERROR

DOWNTIME CAUSES

GENERAL FAILURE
400 PAPER OR INK
401 PACKING/BLANKET
402 ROLLER/DAMPENER
403 REPAIR PLATE
404 REPLATE
405 TENSION
406 PLATE PROB
407 WASHUP
408 WRAP AROUND
415 MECHANICAL PROB
416 ELECTRICAL PROB

PASTER MISS
420 PRESS CAUSED
421 MECHANICAL
422 ELECTRICAL
423 UNKNOWN

WEB BREAK- PAPER CAUSED
431 SLIME HOLE
432 HAIR/FIBER CUT
433 BURST
434 CALEN. OR BLADE
435 MILL SPLICE
436 ALL OTHER

PRESS FAILURE
500 FOLDER JAM
501 DRYER FAILURE
502 LOW UNIT OIL
503 LOW AIR PRESS
504 DRIVE OVERHEAT
505 CHILL WATER
506 FOLDER OIL MIST
507 INFEED OIL MIST
508 PASTER UPPER
509 PASTER LOWER

WEB BREAK OR PASTER MISS
540 UPPER INFEED
541 LOWER INFEED
542 W.B. UNIT 1
543 W.B. UNIT 2
544 W.B. UNIT 3
545 W.B. UNIT 4
546 W.B. UNIT 5
547 W.B. UNIT 6
548 UPPER DRYER
549 UPPER CHILL
550 LOWER CHILL

OP CODE PHRASES, PAGE TWO

| | |
|---|---|
| 561 | INCR GOOD COUNT |
| 562 | DECR GOOD COUNT |

WAITING TIME

INTERNAL DEPT. CHARGE
| | |
|---|---|
| 601 | COMP/PROOF/LINEUP |
| 602 | LITHO |
| 603 | FOUNDRY |

WAIT FOR INTERNAL MATLS.
| | |
|---|---|
| 605 | PAPER |
| 606 | INK |
| 607 | REPLATE (ONE) |
| 608 | REPLATE 2,3,4,....... |

MATERIALS — CUST CHARGE
| | |
|---|---|
| 610 | PLATES |
| 611 | PAPER |

WAITING FOR OK
| | |
|---|---|
| 615 | CUSTOMER OK |
| 616 | QUALITY CONTROL |
| 617 | LINEUP OR EDIT |

OTHER WAITING
| | |
|---|---|
| 620 | MACHINIST |
| 621 | ELECTRICIAN |

MAJOR DOWNTIME
| | |
|---|---|
| 700 | SHUTDOWN/START |
| 710 | MECHANICAL |
| 711 | ELECTRICAL |
| 712 | MAJOR PRESS-ROOM |
| 713 | FIRE IN DUCTS |
| 714 | DISASTER |
| 715 | ACCIDENT |
| 716 | MEETING |

INDIRECT TIME
| | |
|---|---|
| 720 | NO JOB |
| 721 | SCHED IDLE TIME |
| 771 | MACHINE MAINT. |

| | |
|---|---|
| 999 | END SHIFT/JOB |

FIG-20

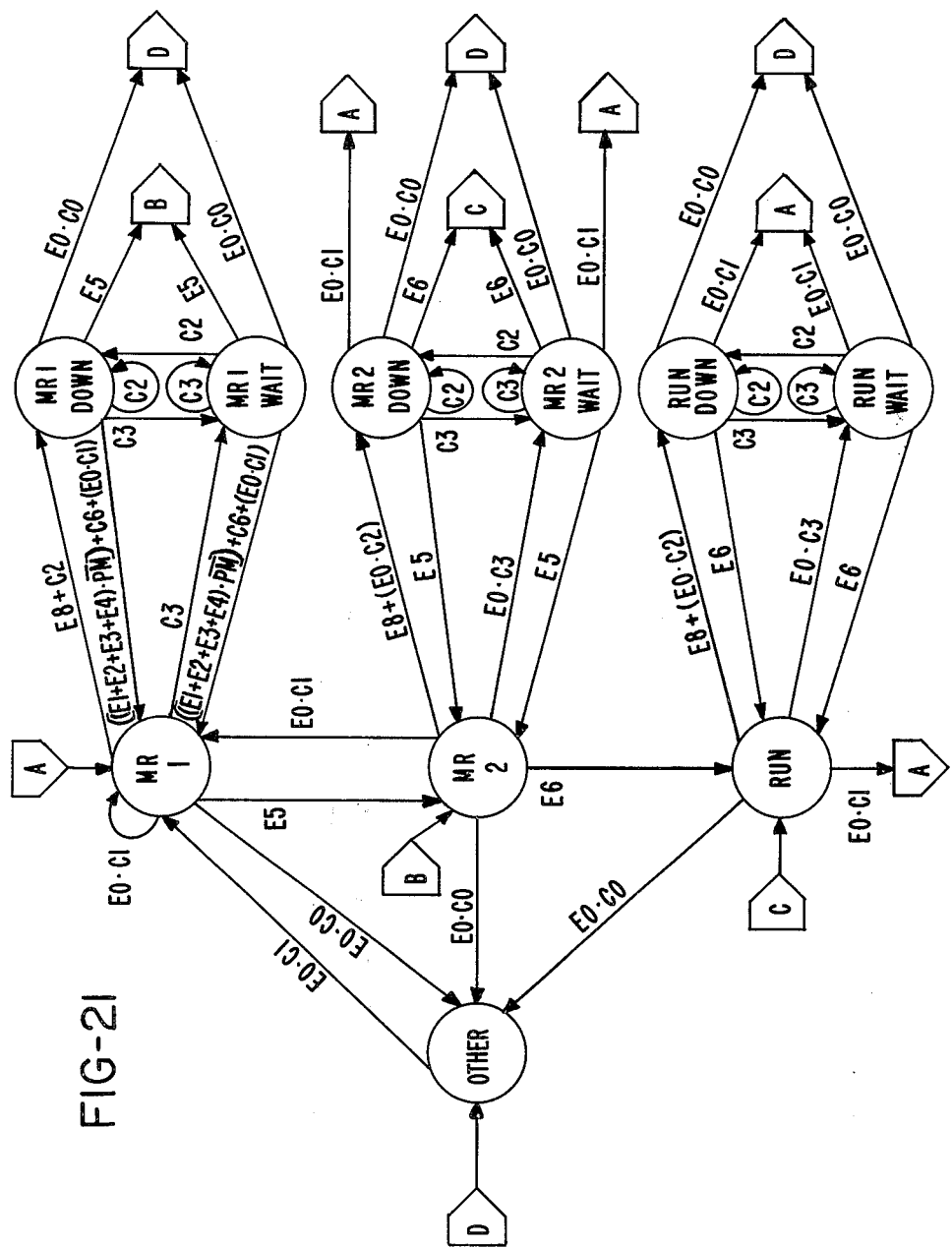

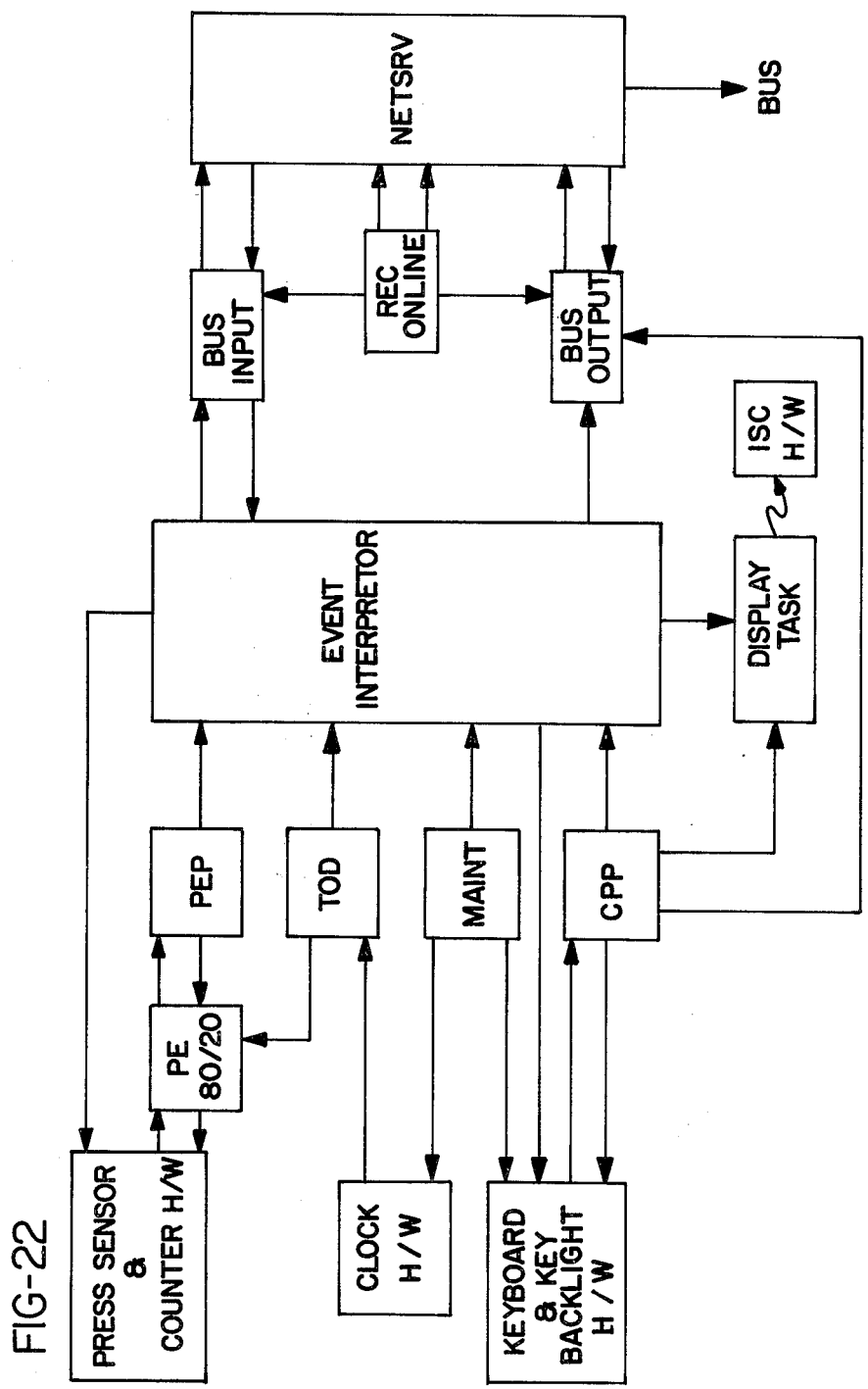

MANAGEMENT AND ANALYSIS SYSTEM FOR WEB MACHINES AND THE LIKE

BACKGROUND OF THE INVENTION

This invention relates to apparatus and a method for the control of web processing equipment, in particular large web printing presses capable of printing upon one or more webs in a number of different colors, and of separating and folding the printed web into sheets or signatures. Such equipment is well known, and automatic controls for such equipment have been utilized for many years, primarily for the purpose of starting, stopping, jogging, and otherwise controlling the various functions of the press and its sections, and related equipment, and to monitor various conditions and provide warnings or emergency controls as desired. Such automated control equipment has developed over the years, from hard wired control circuits, usually involving various relays, switches, etc., into more sophisticated computer controlled systems which preform the same function, or expanded such functions, using solid state components and micro or mini computer equipment. Still, the basic function of this equipment is to control the press, to stop it or give warnings, as may be necessary, in the event of failures or potential failures, and otherwise to assist the press operating crew in the actual makeready and operation of the press, in a semi-automated manner.

There exists, however, a need to monitor and analyze the operations of the machine, and of the crew controlling the machine, in order to achieve the most efficient operation, in order to predict or estimate performance standards, to provide guidance (or performance feedback) to the crew, and in order to provide various records which can be analyzed to assist in achieving a satisfactory regular maintenance program for the press equipment. The present invention relates to such a press management and analysis system, wherein the equipment for gathering, compiling, computing and displaying or printing out data is provided as a adjunct to the press controls, and is utilized to assist the operating crew in the most efficient operation of the press.

SUMMARY OF THE INVENTION

The present invention relates to such a press management and analysis system for a web processing machine, embodying a press monitoring and analysis console (PMA) which is located adjacent the press to which it is related, together with a remote entry computer (REC) with which the PMA can communicate, together with various sensor devices on the press, the states of which are monitored by the PMA and decoded in order to follow the operation of the press from the beginning of a job assignment, through makeready operations, and through the printing operation to completion of the job.

Typically there is one PMA console for each press in the shop, and a single REC console remote from the press room, as in the production manager's office. The REC can communicate with each PMA, and recording (filing), hard copy printing, and like functions are handled at the REC console.

The system provides a number of displays which require completion by the pressman/operator, thus soliciting information from him (or in some cases from the manager's office) as well as informing all concerned of job progress, of standard times expected for a given job, and of transfer from one state or phase of the job, as from makeready time to run time in which good product is printed. The system monitors press functions to feed back and record event messages, and it encourages operator input and identification of stoppage reasons, etc., thereby building a job file for the press which is useful for many management purposes.

The system retains certain coefficients which are used at the beginning of a job, along with input job data, to calculate the standard times for a job of given magnitude, and then incorporates the results of such calculations in the displays for makeready time and run time as standards against which actual times are compared. Alarms are created when projected or actual time exceeds calculated standard time.

The filed information is available for management analysis of the press operation, as in the form of reports compiling desired data into a printer produced report copy at the REC. Such information may, optionally also be communicated to a host computer for storage and/or further analysis. The reports not only identify press and/or crew efficiency or problems, but also provide valuable guidance for maintenance and other management decisions.

The primary object of the invention, therefore, is to provide a management and/or analysis system for use with a printing press, particularly a web press, or similar machine in which multiple functions are performed in registration; to provide such a system which assists and encourages an operator to enter into the system information which is useful for management, operational analysis, time keeping and/or maintenance purposes; to provide such a system which has capability to display to the operator, as on a video terminal, various formats to be completed by the operator through a data entry device; to provide such a system which monitors the progress of a press through a job and displays to the operator an appropriate graphic representation of such progress; to provide such a system which also displays graphic representation of time standards for the progress of a job having certain known requirements; to provide such a system which will generate an alert when actual progress on a job phase exceeds a standard therefore; and to provide such a system which can generate hard copy reports for management and maintenance purposes.

Other objects and advantages of the invention will be apparent from the following description, the accompanying drawings and the appended claims.

BRIEF DESCRIPTION OF THE DRAWINGS

FIG. 1 is a perspective view of the REC console;

FIG. 2 is a schematic view of a typical web printing press to which the invention is applicable;

FIG. 3 is a perspective view of the PMA console;

FIG. 4 is a diagram on an enlarged scale of the entry keyboard on the PMA console;

FIGS. 10 through 18 depict various displays which appear at the consoles during operation of the system;

FIGS. 19 and 20 show the operating code information (menu) available to the operator through the PMA;

FIG. 21 is a system state diagram; and

FIG. 22 is a basic block diagram of hardware and related software tasks for the PMA.

DESCRIPTION OF THE PREFERRED EMBODIMENT GENERAL ARRANGEMENT

Figure 5:
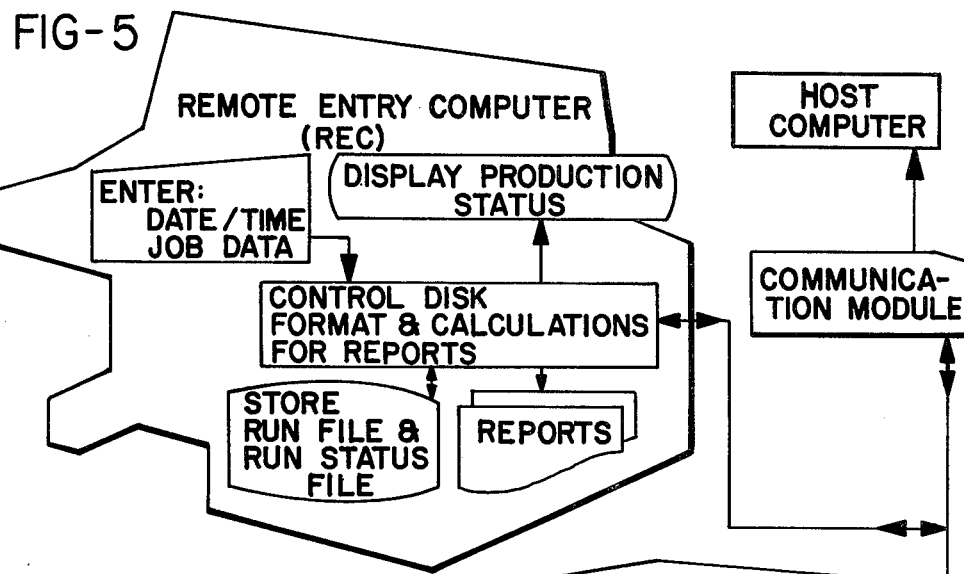
FIG. 5 is a block diagram superimposed upon outlines of the press and the two consoles, showing the overall functional relationship of these.

Referring first to FIG. 2 of the drawings the diagramatic representation of a typical web printing press shows a supply for web material indicated generally at 10. In a typical installation this may include supports for multiple rolls of paper or other web material, whereby one or more webs may be supplied and threaded through the press simultaneously. For example, a typical commercial multicolor offset printing press may print simultaneously on both sides of two different webs, which may even be of dissimilar grades of paper. In a typical embodiment this supply may be in the form of a well known mechanism known in the art as a reel stand which includes provision to support at least four rolls of web material W1, W2, W3, W4, and these feeding into two different accumulator devices (not shown). Thus webs from two different rolls can be fed each into an accumulator, and thence into the press as later described, additional rolls of like material can be ready, and when the first webs are depleted the webs from the rolls in reserve can be pasted to the tail of the webs which are depleting while the press monentarily draws web material from the accumulators. Such devices, which are well known, permit the press to continue operation through two or more subsequent rolls of web material, since the reserve rolls can be used while new additional rolls are placed in the position of the fully depleted rolls. At the outlet of the accumulator there is conventionally an infeed mechanism, not shown, which in general controls the payout of the webs into the printing units of the press, and which may incorporate known types of tension control devices to assure an essentially constant tension in the web material.

From the infeed the webs are threaded through one or more printing units of the press. In the diagram these are indicated schematically at items 11-15, representative of five printing units for a five color perfecting web press. Each printing unit includes the usual upper and lower printing couples for printing on opposite sides of the web material threaded therethrough, and these include upper and lower blanket cylinders, plate cylinders, inkers, dampeners, etc. which are per se well known. A typical multicolor opeeration prints the color black first, for example on printing unit 11 or 12, and then subsequently prints in other colors registering these other colors to the base or black print.

The printed web materials enter a dryer unit 20 which includes conventional upper and lower heated drying equipment for the multiple webs. Following the drying unit are upper and lower chill rolls 22 which receive and cool the web material leaving the dryer, and following the chill rolls there may be further web guiding and coating equipment, as for applying a silicone coating to one or both sides of the web material, these being indicated generally at 24. Finally the web material passes into the folding equipment 25 where the web material may be folded lengthwise, folded across its width and separated into individual signatures, and from the folders the material may pass to conventional stackers or other suitable delivery equipment.

Typically a drive including an electric motor 27 and line shaft 28 provides a power source for at least all the printing units and the infeed mechanism. The driver, chill rolls, folders, and delivery equipment may have separate power sources. The foregoing description of a typical press is provided by way of background, and it should be understood that various types of web handling equipment are within the scope of the invention, including different forms of printing equipment such as lithographic, gravure, or other printing processes.

In the use of such equipment, generally there are two modes or states, one preparatory and the other a good product running operation; in the printing art these generally are designated as makeready time and running time for good product. These are general descriptions, but are fairly uniformly understood. Phase I of makeready time (MR1) may involve preparation of the various parts of the press, at a standstill, such as mounting new blankets, hanging the necessary plates for the job, washing-up the various rolls, etc. in preparation for a new job, mounting the rolls of web material, and threading this web material through the various printing units and subsequent dryers, coaters, folders, etc. in accordance with the requirements of that particular job.

Once the web material is threaded, it is necessary to register the several different color images in order to produce the final fully registered print, and this in turn requires jogging and/or low speed running of the press, and some full speed running, in order to assure that registration is accurate and complete. Printed material resulting from this operation is waste, it is not a useful product, hence this is all part of the makeready process. This is referred to hereafter as phase II makeready (MR2). When the press is finally prepared for full speed continuous printing, then the operator or crew chief indicates in some manner that the "good count" has begun, and from that point on the product is saved and stacked, etc. as necessary to fulfill the job requirements.

During the makeready process the various printing units and other equipment may need to be declutched from the drive and line shaft, may need to be manipulated and rotated by hand, or may need to be jogged throughh the drive, as called for during various steps of the makeready process. Such process, again, is well known, and the various steps required will depend upon the exact type of printing equipment, the nature of the product, and other factors which need not be considered here.

When the number of impressions required for a job has been completed, the press is then shut down and the job is considered finished. Cleanup following a finished job is generally considered part of the makeready procedure for the subsequent job. Different types of web material may now be required, different plates almost always are required, blankets may need to be replaced, the inkers washed up and the color or type of ink changed, and various other procedures may have to be followed, all as preparation or makeready for the next job.

The purpose of the present invention is to assist the crew in the entire operation of the equipment, from the beginning of makeready throughout the job, by accepting information input by the crew, or by the manager of the printing establishment, by constantly monitoring the progress of each job, recording pertinent information in the form of event messages, assisting the crew by exhibiting various displays which encourage feed back into the system of exact information as to what is occurring during a job, what deviations may be encountered from the normal expected steps of the job, identifying such deviations or stoppages, including the reasons for them, and in general providing a data base from which the continuing usage of the press can be more effectively managed. Also displayed are various comparisons in the form of bar graphs, which will show a standard time for a given job, the actual time being required to reach certain steps in the progress of the job, projected total based on actual progress, and other related data including alarms when the job is running beyond projected time requirements, or has encountered some emergency which requires that the press be shut down unexpectedly.

For this purpose, the press and related equipment is provided with a large number of sensors. In general, these fall into three different classes. One type involves contacts on existing switches or relays, indicating that a particular device is in one of two states, another type is digital information which may be obtained from counters. Typical digital outputs would be for press speed, elapsed total time, gross or total impression count, and good count. In addition some sensor devices may be in the form of analog output mechanisms, the outputs of these being compared against a standard for that particular associated function or mechanism, so that abnormal readings from the analog devices will result in outputs. These real time input signals from the press are sensed and decoded, and thus provide event codes which result in event messages. These are described later in further detail, however it should be noted that event codes are derived from press signals listed in Table I.

Referring to FIGS. 1–6 of the drawings, and first to FIG. 1, there is shown the remote entry computer equipment REC console 30 which is housed in a desk 31 and includes a smart color CRT terminal 33, an entry keyboard 34 associated therewith, a microcomputer 35 which may, for example, include an Intel model 8080 microprocessor, a communications module (not illustrated) housed with the computer, a magnetic disc recorder 36 which may be for example a dual floppy disc drive, and a suitable printer 37.

The REC is intended to be located remote from the press room, for example in the office of the production manager or pressroom foreman of the printing house, where he or a member of his staff may observe the terminal 33, and may input data via the REC keyboard 34. Someone in this location may also be responsible for the handling of hard copy output, such as reports, from the aforementioned printer which is part of the REC.

Figure 8:
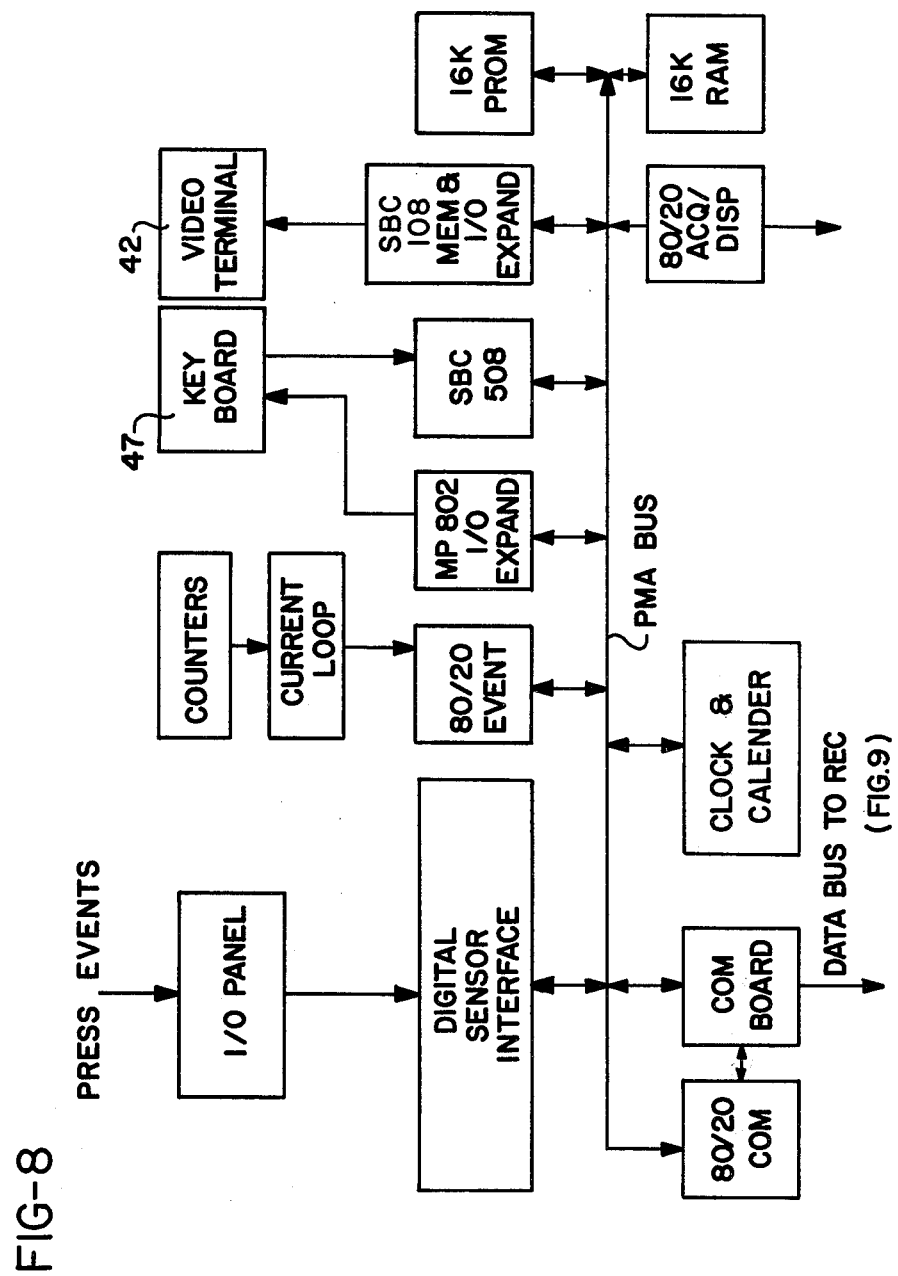
FIG. 8 is a block diagram of the PMA console electronic hardware.

Referring to FIG. 3 the press management and analysis equipment, hereinafter referred to as PMA, is housed in a console 40 which may be part of a press control console, not shown. The PMA console incorporates a data output device in the form of a color CRT terminal 42, a bank of LED digital displays 43, 44 and 45 which output from digital counters, and a data input device in the form of a keyboard 47 which is shown in greater detail in FIG. 4. The PMA console is located on the printing room floor, preferably adjacent the press shown in FIG. 2, where it is accessible to the press crew, it being intended that the crew chief or some designated crew member be responsible for monitoring the PMA terminal 42 and for entering data via the keyboard 47. FIG. 8 of the drawings illustrates in the form of a hardware block diagram the type and arrangement of the PMA processing electronics equipment, which is housed in the PMA console 40.

Figure 7:
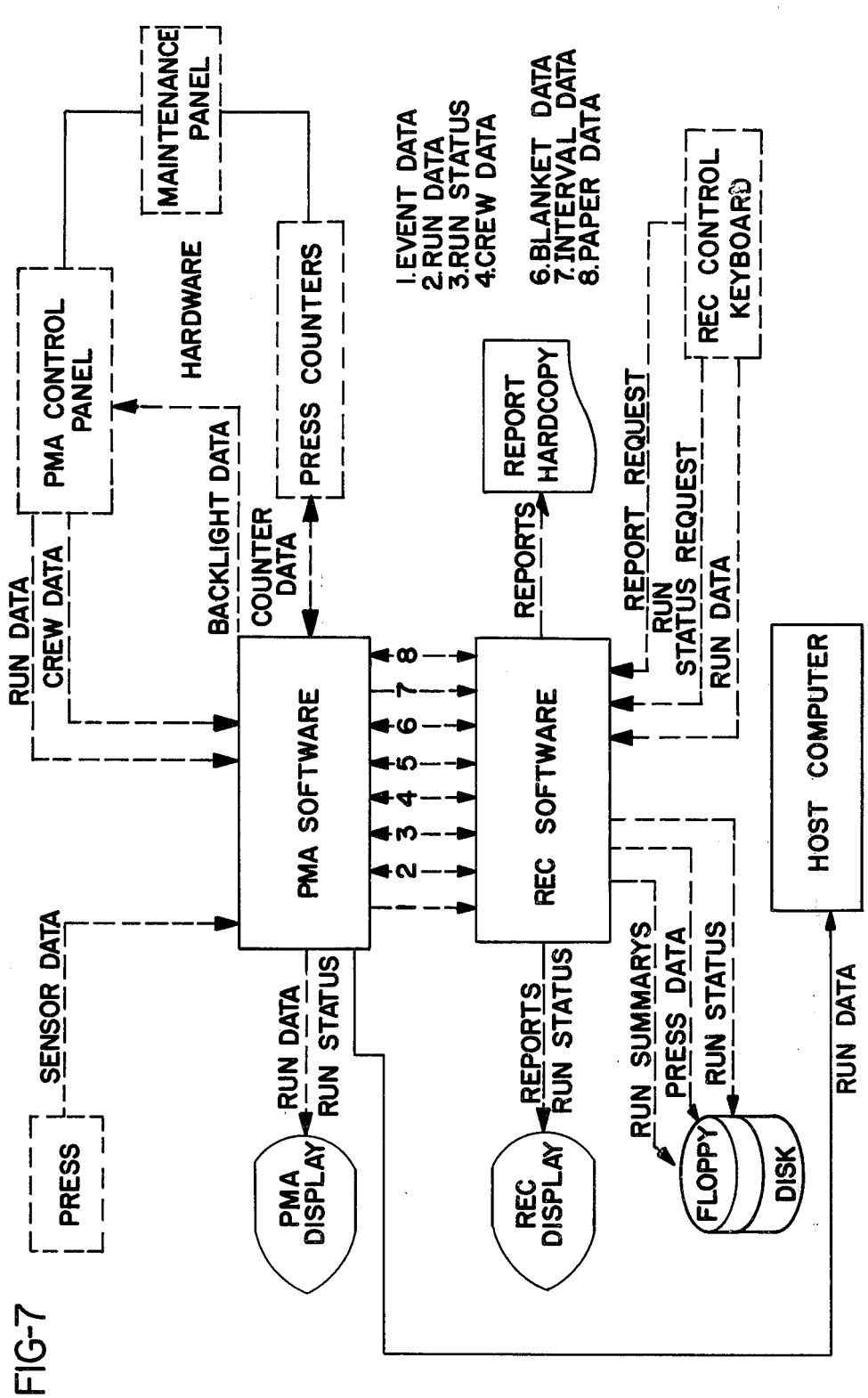
FIG. 7 is a diagram presenting an overview of the software system by which the console computers and displays and the press, communicate.

As shown broadly in FIG. 5, and also indicated in FIG. 7 at the bottom, provisions are included in the system for connection of the REC and the PMA via a communications module to a general purpose host computer, which may be used to provide a storage file of job operations information. This feature is merely an adjunct and not a necessary part of the system.

Referring to FIGS. 5, 7, 21 and 22, the general cooperation between the press, the PMA and the REC is depicted in terms of various operations. FIG. 21 indicates the event codes used by the system to detect transitions from one operation to the next. Event codes derived from signals detected by the sensors on the press are explained hereinafter in connection with Table I.

Operations codes (OPCODE) are entered into the system via the PMA keyboard. In general, operation codes are required to distinguish between operations that cannot be differentiated by means of event codes. A listing of the operation codes appears in FIGS. 19 and 20 which show the menu displays that are available to the PMA operator to refresh his memory concerning these various codes.

The basic functions of the PMA computer module are to (1) detect events that represent transitions from one operation to the next and transmit event messages describing the circumstances of the event to the REC for storage and (2) accumulate time spent in each operation and transmit operation messages containing these times to the REC for storage (filing). Also, operation messages containing the number of net signatures (output product) and of waste associated with each operation, may be detected and transmitted.

The REC stores or files event and operations messages, generates alerts for certain kinds of event messages, and also stores status information for the PMA during periods when power is off at the PMA.

PMA EQUIPMENT

As described in connection with FIG. 3, the PMA module is housed in the console 40. The equipment includes the keyboard 47 (FIG. 4) the color CRT 42 and the counter displays 43–45 which comprise the complete display device, as well as power supply and maintenance equipment all housed in the cabinet. In a typical installation the controls for the press include a relay rack which is part of the control system and most connections from the PMA module to the press are provided through contacts in this relay control. The PMA keyboard or entry device shown in FIG. 4 is intended to minimize button pushes for major functions, while providing for expansion in case additional features needed to be added to the system. Keyboard operation may be summarized as follows:

| | |
|---|---|
| GOOD | Used to indicate the saving of signatures. Pressing button starts good counter. |
| OP CODE | Used to enter Op codes or display the Op code directory. Pressing OP CODE followed by three digits and ENTER supplies the Op code to the computer. Op codes are required by the system to start a job, end a job and explain press stoppages. At these times the |

| | |
|---|---|
| | interactive display will request an OP code from the "pressmen". |
| DISPLAY | Used to select display on the CRT or show display menu. Pressing DISPLAY followed by ENTER selects the menu display. Each display available from that terminal is identified by a number; see FIGS. 12 and 13. Pressing DISPLAY, followed by a display number (supplied using the digital keyboard), followed by ENTER, selects the display indentified by that number. If the display number is known, selecting the display menu is unnecessary. |
| NEXT | Some tables or graphs are too large for display on the CRT screen at one time, and must be divided into segments; pressing the NEXT button displays each additional segment. The NEXT button is also used to display tables or graphs which are closely related to a display presently on the screen. Pressing NEXT button brings up the related display. |
| FORWARD and BACKUP | When filling out a table displayed on the CRT the operator is assisted by use of a cursor. The cursor is sequentially moved from field to field to assist the operator in filling out the table. Manual control of the cursor to change a field already filled is done with the FORWARD/BACKUP buttons. Pressing one of these moves the cursor to the next or previous field. Continued pressing will move the cursor starting through the dispaly. |
| ENTER | Pressing the ENTER button signifies the end of an action and signals the computer to start processing. ENTER for example is always pressed after supplying data at the keyboard. |

As mentioned, the color CRT 42 provides part of a display device, along with three digital displays 43-45 which are part of counters. In a typical installation one four digit counter display 43 is used for press speed, and two six digit displays 44 and 45 are provided for gross count and good count, respectively and each of these includes a reset button.

The heart of the system is the PMA computer module, and its basic functions are (a) automatically gathering production statistics and relating these to calculated standards for each job. Emphasized are makeready time, makeready waste, running time, running waste, and productivity in impressions per hour.

(b) providing feedback to the pressman/operator regarding current productivity including an estimate of time to complete the present job.

(c) recording operation codes supplied by the operator signalling start of a job, completion of a job, and explanation of press down time.

(d) automatically recording sensor outputs describing operating states of the press such as web breaks, lubrication failures, etc.

(e) providing data to update manufacturing standards for use with automatic or manual estimating, and (f) maintaining a file of blankets used (in the case of a lithographic press), and (g) logging in of crew personnel.

PMA Hardware

FIG. 8 is a block diagram of the electronic hardware in a typical PMA console. Preferably it consists of three single board computers (Intel Model SBC 80/20), each of which includes an eight-bit CPU, a system clock, a 2K RAM, an 8K PROM, programmable parallel input-output (I/O) lines which are implemented by Intel type 8255 peripheral interface devices, an RS 232C interface device, an Intel type 8253 interval timer, an Intel type 8259 interrupt controller, and bus control logic and driver circuits. These are all per se known devices.

There is also a memory and input-output expansion board (Intel Model SBC 108) consisting of a RAM, a PROM, an Intel type 3222 refresh controller, two type 8255 programmable peripheral interfaces which provide programmable I/O lines, an interval timer, a multiplexer, an RS 232C interface circuit, and control logic and driver circuits. A special input-output expansion board (Intel SBC 508) receives inputs from keyboard 77, and includes four input and four output ports.

As seen from the drawing, the internal PMA multibus provides communication among (a) the digital sensor interface boards (MP810) which receive press event inputs from an I/O panel;

(b) the 80/20 EVENT computer which also receives input from the counters (43, 44, 45) via the current loop, and decodes inputs from the digital sensor boards into event codes;

(c) the I/O and expansion board (Intel SBC 508), and a standard I/O expansion board (Burr Brown MP 802) which in turn communicate with the keyboards and the back light for its keys;

(d) the SBC 108 memory and the I/O expansion board which in turn outputs to the video display;

(e) a PROM;

(f) a custom communication board (which may be of the type disclosed in U.S. patent application Ser. No. 973,684 filed Dec. 27, 1978 in the names of N. P. DeMesa and J. E. Laabs entitled Bus Collision Avoidance System etc,);

(g) the 80/20 communication computer; and (k) the 80/20 ACQ/DISP computer; and (l) ISC 8001 Intelligent Systems Corporation Terminal, including color CRT and keyboard.

REC HARDWARE

Figure 9:
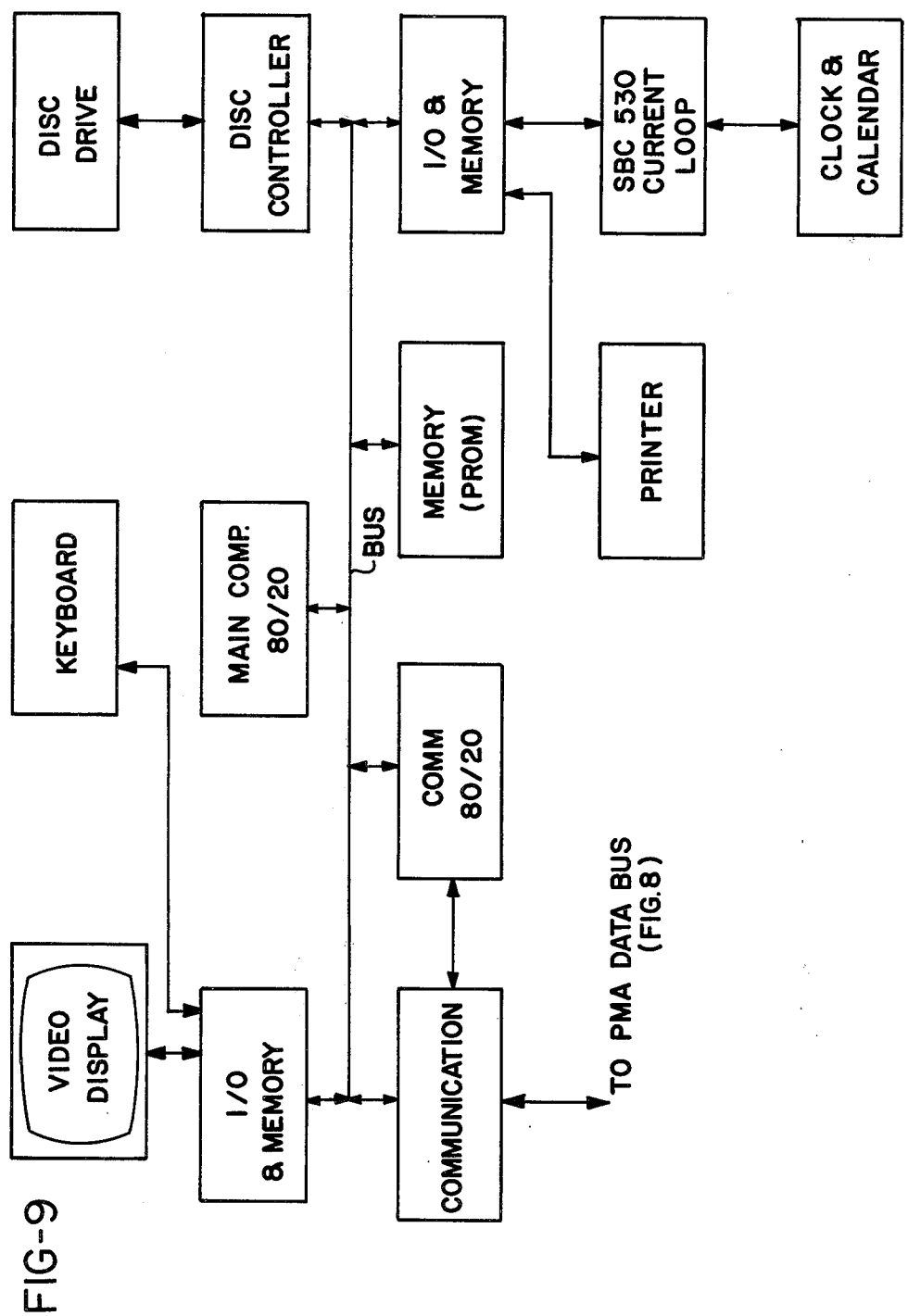
FIG. 9 is a block diagram of the REC electronic hardware.

FIG. 9 is a block diagram of the hardware arrangement of the REC. The REC consists primarily of an ISC8001 terminal/computer, an Intel SBC660 chassis which holds the main computer, a dual Shugart disk storage unit, and a Centronics printer.

The ISC8001 (Intelligent Systems Corporation) is a self-contained microcomputer with an 8080 microprocessor, 8K bytes of display RAM, up to 24K bytes of user program storage. The ISC also has a keyboard input and a serial port for two way communications to the main computer. Eleven different displays are pre-programmed into the ISC, making it an intelligent device. Simple requests are made by the main processor since the burden of display generation is on the ISC. It is also pre-processes keyboard input, and only notifys the host when valid operator entries are made. Communication to the main processor is via a standard RS232 terminal interface.

The Intel SBC660 chassis holds the bulk of the processing capabilities and consists of:

(1) 80/20 which acts as main processor;

(2) Comm Station—consisting of 80/20 processor and a special HMCS bus communication board (same type as above identified in the copending U.S. application of DeMesa and Laabs);
(3) SBC201 Floppy disc controller—two boards, channel controller and drive interface;
(4) PROM 32—which holds 32K bytes of EPROM;
(5) SBC108—which holds 8K of EPROM and input-/output to ISC terminal, and
(6) SBC116—16K bytes of RAM and input/output to clock, calendar, and printer.

The disc storage consists of two Shugart 801 floppy disc drives. Each drive is single density and capable of storing 2002 blocks of 128 bytes. Each disc is organized into files, a directory of which is maintained on the disc. The main computer 80/20 maintains files through the SBC201 floppy disc controller.

The video terminal and keyboard thus provide an information input/output device to supervisory personnel, the disk drive and printer provide memory storage and hard copy for reports, etc., and the main computer controls the management and transfer of information by the REC. Again, the components are per se standard items and details of their cooperation in the system will be apparent to persons skilled in the art of data processing and equipment.

Real-Time Input Signals

Except when press power is off a number of sensors on the press are monitored, giving on-going feed back of information to the system. Automatic inputs to the system, using this information, include (a) production statistics—e.g. time, gross count, good count and press speed;

(b) press status—e.g. infeed dancer position, web guide sensors, forward/reverse, impression on, temperature and lube pressure sensors;

(c) changes in operating conditions—e.g. emergency stop, crew change, shift change, web break, folder jam. All items other than production statistics are considered as events whose impact on production will be recorded and assessed. Detected events are tagged with job-form-run number, time, good count, gross count, press speed and point of occurence, to provide event messages.

Table I, at the end of the specification, indentifies the sensors for a typical installation. These are illustrated schematically in FIG. 2, under the term Press Signal Sensors. The numerals associated with the sensor identification are bit assignments which are useful in understanding the interpretation of messages derived from sensor conditions.

Definitions for certain signals, used in defining events in the system, are as follows:

| | |
|---|---|
| (CRUN) | One when press is in continuous run. zero otherwise. |
| (20% SPD) | One when press is above 20% of full speed. Zero otherwise. |
| (FLDR) | Zero when folder is engaged. One otherwise. |
| (IMPR) | One when impressions is on. Any one of seven signals indicate impression on. (press & auto on and unit impression 1-6) |
| (SLOWER) | One when the slower button is depressed. Zero otherwise. |
| (FASTER) | One when the faster button is depressed. Zero otherwise. |
| (INCH) | One when the inch button is depressed. Zero otherwise. |
| (REVERSE) | One when the reverse button is depressed. Zero otherwise. |
| (NETCNT) | One when the net counter is turned on. Zero otherwise (good counter). |
| (SAFE) | One when the safe condition is set. Press cannot be run or jogged until safe is reset. |
| (READY) | One when the press is stopped and ready for jogging or inching into continuous run. |
| (PASTE 1) | One during web splicer paste cycle. Zero otherwise. Two paster signals (paste 1, paste 2) are available, one for each web. |

As part of its function the PMA computer module interprets bit patterns from these sensors, and distinguishes ten events. These are defined as follows, first by name, then by boolean expression in terms of the bit numbers from Table I, and also in text explanation. The boolean expression is in terms of bit numbers, AND (·), OR (+) and NOT (−).

E0 Press Stop
  E0 = (SAFE) + (READY)
    (62 + 63)
  Either "safe" or "Ready" signal indicates the press is (or will be) stopped. An event, automatically or manually actuated, that commands the press to stop will set the safe condition immediately upon receipt of the command. The press must stop before a new run state can be established. For example, a web break or a red button stop sets the safe condition in the drive controller with the press in the deceleration mode. Restart can only take place after stop.

E1 Washup (cleaning press)
  E1 = (CRUN)·(20% SPD)·(IMPR)·(FLDR)
  $\overline{(51+52+53+54+55+56)}$·48·50·49
  Washup assumes press cleaning without a web and continuous run above 20% of press speed.

E2 Washing Blankets
  E2 = (CRUN)·$\overline{(20\% \text{ SPD})}$·(FLDR)
  48·$\overline{50}$·49
  Plate and blanket washup assumes a slow speed washup without a web, folder not engaged.

E3 Removing or Hanging Plates
  E3 = [($\overline{\text{SLOWER}}$)·(INCH)+(REVERSE)]·(FLDR)
  [($\overline{59}$·61)+60]·49
  Removing or hanging plates is indicated by press jogging and the folder not engaged.

E4 Leading Webs
  E4 = [(INCH)+(CRUN)]·$\overline{\text{IMPR}}$·(FLDR)
  (48+61)·$\overline{(51+52+53+54+55+56)}$·49
  Leading webs assumes some forward jogging or continuous run at slow speed with the folder engaged.

E5 Printing Waste
  E5 = (CRUN)·(IMPR)·$\overline{(\text{NETCNT})}$
  48·(51+52+53+54+55+56)·$\overline{35}$
  Printing waste is indicated by the printing state and good counter off. Printed material is not being save.

E6 Printing Good
  E6 = (CRUN)·(IMPR)·(NETCNT)
  48·(51+52+53+54+55+56)·35
  Printing good is assumed when printing and the operator turns on the good counter at the floor.

E7 Speed Change
  E7 = (SLOWER)+(FASTER)
  59+58
  Speed change is of no interest in itself.

However, speed change may cause another event to occur such as press failure (web break, folder jam, etc.) creating an interest in speed changes for a short period after such a change occurs. If an event does occur within the predetermined time after a speed change, then the speed change will be reported with the event as possible event cause.
At each speed change occurrence a record will be saved for that predetermined period of
1. Starting press speed, S1
2. Direction of speed change
3. Ending press speed, S2
4. Counter information E8 Press Failure
E8 = [(SAFE)+(READY)]·[20% SPD]·
50·(62+63)·
$$\begin{bmatrix} \text{Web Break } (2+3+4+5+6+7)+ \\ \text{Red Button } 66 + \\ \text{Folder Jam CYL } 16 + \\ \text{Low Air Pressure } 34 + \\ \text{Oil Flow Unit 1 } 19 + \\ \text{Oil Flow Unit 2 } 20 + \\ \text{Oil Flow Unit 3 } 21 + \\ \text{Oil Flow Unit 4 } 22 + \\ \text{Oil Flow Unit 5 } 23 + \\ \text{Oil Flow Unit 6 } 24 + \\ \text{Oil Flow Folder } 25 + \\ \text{Oil Flow Infeed } 26 + \\ \text{Oil Flow Chill } 27 + \\ \text{Drive Hi Temp } 28 + \\ \text{XFMR Hi Temp } 29 + \\ \text{SCR Bridge Hi Temp } 30 + \\ \text{TPC Bridge Hi Temp } 31 + \\ \text{Chill Hi Temp } 32 \end{bmatrix}$$
Press failure is determined by the actuation of an auto or manual press stop.

E9 Paste
E9 = Past 1 + Paste 2
(64 + 65)
New web splice is indicated by a paste signal the paste event indicates a small portion of material will be printed waste in the area of the splice.

The PMA computer module will interpret some button pushes at its keyboard as events independent of the input derived from the press sensors. These other events are defined as C0 Run End
When entered this signifies the end of a run and succeeding time is under Other Time C1 Makeready 1
When entered, terminates Other Time and outputs Makeready 1 display to the CRT.

C2 Downtime
Allows pressman to explain reason for production halt due to a press failure.

C3 Waittime
Signifies that some type of non productive wait period.

C4 Running (Saving)
Signifies that the press is in the Running state.

C5 Running Waste
Signifies that the press is in the Running state but the signatures are not to be saved.

C6 Operation End
Signifies the end of the current downtime or waittime operation.

C7 Enter
Indicates that the data in the display (JOB-FORM-RUN, BLANKET, CREW, etc.) is correct as shown.

Indicates completion of current data entry operation.

The network of press operations through a typical job is shown in FIG. 21, with the real time events noted thereon. The four basic status symbols are Makeready phase I (MR1), Makeready phase II (MR2), Run, and Other; within the first three, transitions may occur to either "down" or "wait" conditions, depending on the reasons for stoppage or deviation from the usual ongoing makeready and run modes. The pentagonal symbols merely indicate event loops, thus any input to symbol A means a return to MR1, any input to symbol B means return to MR2, etc.

PMA HARDWARE/SOFTWARE

FIG. 22 shows the PMA in basic block diagram form together with the related software tasks. The software can take various specific forms, as is known in the programming art, but for purposes of the invention the following software tasks are provided:

(1) Time of Day (TOD)—activates once each minute to update shift and interval timers, to update hours and minutes in the database from the hardware clock, check for shift change times, check for end-of-day based on the hardware clock, and generate shift and day change events to the Event Interpreter.

(2) Paste Timing—activated by the Paste event (E9) processing subroutine of the Event Interpreter to perform the delay and cutoff of the net counter as required.

(3) Press Event Processing (PEP)—handles incoming press event data from the 80/20 Event computer and uses it to generate events to the Event Interpreter.

(4) Control Panel Processing (CPP)—processes keyboard input from the operator, generates messages to the REC, events of the Event Interpreter, and outputs to the display; the procedure CPP is the initialization and main loop of the task, and is supported by a number of subroutines which are activated based on incoming character and current input display.

(5) Display (DISP)—handles generation and update of the three screen areas (FIG. 6) at the CRT as directed by other tasks in the system.

(6) Communications Bus Network Service (NETSRV)—provides interface to the bus hardware and basic communications software functions.

(7) REC Online—monitors the bus for the REC ONLINE message, which notifies the PMA that the REC is operating and can communicate via the bus. When the message is received, the task clears the REC-DOWN-FLAG, notifying the other bus tasks that they can resume transmission to the REC.

(8) Bus Output—outputs messages from other PMA tasks to the bus via NETSRV; automatically sends messages to both the REC and the Host; after sending a message to the REC, waits for receipt of an "accept" message.

(9) Bus Input—Using buffers supplied by other PMA tasks, receives data messages from the bus via NETSRV; sends an "accept" message via BUS-OUTPUT-TASK for each message received.

(10) Event Interpretes—processes "events" received as messages from the TOD, PEP, CPP, and BUS-INPUT-TASK tasks. These events represent press events, time events, keyboard entries, and receipt of data from the REC. Processing of events consists of updating shift, interval, state, and counter data, generating messages to the bus, and updating the current status display. The procedure EVENT-INTERPRETER is the initialization and main loop of the task, and is supported by a large number of subroutines activated based on an event. This task is the heart of the PMA. All of the preceeding tasks provide input to or output from the Event Interpretor.

(11) Maintenance (MAINT)—provides a means to set time and date on the hardware clock, lamp test the keyboard backlights, and inject events to the Event Interpretor for the purpose of debug and test in the field.

Messages—PMA/REC Message Exchange

Various messages are exchanged between the PMA and REC, most information flowing to the REC for filing. Table II illustrates the messages exchanged, the types of messages being as follows:

| Message-PMA to REC | Indent (in base 10) |
|---|---|
| TIME REQUEST | 0 |
| MAKEREADY EVENT | 1 |
| END OF SHIFT | 2 |
| END OF DAY | 3 |
| EVENT | 4 |
| INTERVAL | 5 |
| MAKEREADY INTERVAL | 6 |
| RUN INTERVAL | 7 |
| SHIFT PRODUCTION | 8 |
| PRESS STATUS | 9 |
| CREW LOG ON | 10 |
| CREW LOG OFF | 11 |
| CURRENT BLANKETS | 12–15 |
| DEAD BLANKETS | 16 |
| PRODUCTION ORDER | 17 |
| Message-REC to PMA | Indent |
| TIME SYNCH | 0 |
| MAKEREADY DATA | 16 |

Examples of the information content of these messages are as follows. In these examples a byte is eight bits (0000 0000) and large numbers are expressed in scientific (exponential) notation. Some information is expressed in ASCII Code, in which case one byte defines one letter of the code.

| Time Request Message | |
|---|---|
| MESSAGE TYPE | 1 byte |
| PRESS | 1 byte |
| | total - 2 bytes |

Makeready Event Message
| End-of-Shift/End-of-Day Message | |
|---|---|
| MESSAGE TYPE | 1 byte |
| PRESS | 1 byte |
| SHIFT | 1 byte |
| JOB | 2 byte |
| FORM | 2 byte |
| RUN | 1 byte |
| HOURS | 1 byte |
| MINUTES | 1 byte |
| OPCODE | 1 byte |
| | total - 11 bytes |

| Event Message | |
|---|---|
| MESSAGE TYPE | 1 byte |
| PRESS | 1 byte |
| SHIFT | 1 byte |
| JOB | 2 byte |
| FORM | 2 byte |
| RUN | 1 byte |
| HOURS | 1 byte |
| MINUTES | 1 byte |
| OPCODE | 1 byte |
| NET LINEAR FEET 1 | 4 byte-scien. |
| NET LINEAR FEET 2 | 4 byte-scien. |
| GROSS LINEAR FEET 1 | 4 byte-scien. |
| GROSS LINEAR FEET 2 | 4 byte-scien. |
| NET COUNT | 4 byte-scien. |
| WASTE COUNT | 4 byte-scien. |
| SPEED | 2 byte |
| | 37 bytes |

| Interval Message | |
|---|---|
| MESSAGE TYPE | 1 byte |
| PRESS | 1 byte |
| SHIFT | 1 byte |
| JOB | 2 byte |
| FORM | 2 byte |
| RUN | 1 byte |
| HOURS | 1 byte |
| MINUTES | 1 byte |
| OPCODE AT START | 1 byte |
| OPCODE AT END | 1 byte |
| ACTUAL TIME | 2 byte |
| STANDARD TIME | 2 byte |
| ACTUAL NET | 4 byte-scien. |
| STANDARD NET | 4 byte-scien. |
| ACTUAL WASTE | 4 byte-scien. |
| STANDARD WASTE | 4 byte-scien. |
| AVERAGE SPEED | 2 byte |
| ACTUAL NET LINEAR FEET 1 | 4 byte-scien. |
| ACTUAL NET LINEAR FEET 2 | 4 byte-scien. |
| ACTUAL GROSS LINEAR FEET 1 | 4 byte-scien. |
| ACTUAL GROSS LINEAR FEET 2 | 4 byte scien. |
| | 50 bytes |

| Makeready/Run Interval Message | |
|---|---|
| MESSAGE TYPE | 1 byte |
| PRESS | 1 byte |
| SHIFT | 1 byte |
| JOB | 2 byte |
| FORM | 2 byte |
| RUN | 1 byte |
| HOURS | 1 byte |
| MINUTES | 1 byte |
| OPCODE AT START | 1 byte |
| OPCODE AT END | 1 byte |
| ACTUAL TIME | 2 byte |
| STANDARD TIME | 2 byte |
| ACTUAL NET | 4 byte-scien. |
| STANDARD NET | 4 byte-scien. |
| ACTUAL WASTE | 4 byte-scien. |
| STANDARD WASTE | 4 byte-scien. |
| AVERAGE SPEED | 2 byte |
| ACTUAL NET LINEAR FEET 1 | 4 byte-scien. |
| ACTUAL NET LINEAR FEET 2 | 4 byte-scien. |
| ACTUAL GROSS LINEAR FEET 1 | 4 byte-scien. |
| ACTUAL GROSS LINEAR FEET 2 | 4 byte-scien. |
| ACTUAL DOWN TIME | 2 byte |
| ACTUAL DOWN WASTE | 4 byte-scien. |
| ACTUAL WAIT TIME | 2 byte |
| ACTUAL WAIT WASTE | 4 byte-scien. |
| ACTUAL PM TIME | 2 byte |
| ACTUAL PM WASTE | 4 byte-scien. |
| | 68 bytes |

| Shift Production Message | |
|---|---|
| MESSAGE TYPE | 1 byte |
| PRESS | 1 byte |
| SHIFT | 1 byte |
| JOB | 2 byte |
| FORM | 2 byte |
| RUN | 1 byte |
| HOURS | 1 byte |
| MINUTES | 1 byte |
| ACTUAL MAKEREADY TIME | 2 byte |
| STANDARD MAKEREADY TIME | 2 byte |
| ACTUAL MAKEREADY WASTE | 4 byte-scien. |
| STANDARD MAKEREADY WASTE | 4 byte-scien. |
| ACTUAL RUN TIME | 2 byte |
| STANDARD RUN TIME | 2 byte |
| ACTUAL RUN NET | 4 byte-scien. |
| STANDARD RUN NET | 4 byte-scien. |
| ACTUAL RUN WASTE | 4 byte-scien. |
| STANDARD RUN WASTE | 4 byte-scien. |
| ACTUAL RUN GROSS | 4 byte-scien. |
| STANDARD RUN GROSS | 4 byte-scien. |
| ACTUAL DOWN TIME | 2 byte |
| STANDARD DOWN TIME | 2 byte |
| | 54 bytes |

-continued

Press Status Message

| | |
|---|---|
| MESSAGE TYPE | 1 byte |
| PRESS | 1 byte |
| SHIFT | 1 byte |
| JOB | 2 byte |
| FORM | 2 byte |
| RUN | 1 byte |
| HOURS | 1 byte |
| MINUTES | 1 byte |
| STATE | 1 byte |
| ACTUAL MAKEREADY TIME | 2 byte |
| STANDARD MAKEREADY TIME | 2 byte |
| PROJECTED MAKEREADY TIME | 2 byte |
| ACTUAL RUN TIME | 2 byte |
| STANDARD RUN TIME | 2 byte |
| PROJECTED RUN TIME | 2 byte |
| ACTUAL SPEED | 2 byte |
| STANDARD SPEED | 2 byte |
| BLANKET IMPRESSIONS (2 bytes × 16) | 32 bytes |
| | 59 bytes |

Crew Message

| | | |
|---|---|---|
| MESSAGE TYPE | | 1 byte |
| PRESS | | 1 byte |
| SHIFT | | 1 byte |
| JOB | | 2 byte |
| FORM | | 2 byte |
| RUN | | 1 byte |
| HOURS | | 1 byte |
| MINUTES | | 1 byte |
| CREWMAN (6) BADGE | 5 ASCII | |
| ON TIME | 4 ASCII | |
| OFF TIME | 4 ASCII | |
| | 13 ASCII × 6 = | 78 ASCII |
| | | 88 bytes |

Current Blankets Message

| | | |
|---|---|---|
| MESSAGE TYPE | | 1 byte |
| PRESS | | 1 byte |
| SHIFT | | 1 byte |
| JOB | | 2 byte |
| FORM | | 2 byte |
| RUN | | 1 byte |
| HOURS | | 1 byte |
| MINUTES | | 1 byte |
| SERIAL NUMBER | 5 ASCII | |
| CUT | 3 ASCII | |
| MANUFACTURER CODE 1 | 1 ASCII | |
| MANUFACTURER CODE 2 | 6 ASCII | |
| NEW/USED | 1 ASCII | |
| CHANGE CODE | 1 ASCII | |
| UNDERLAY | 3 ASCII | |
| THICKNESS | 3 ASCII | |
| IMPRESSIONS × 1000 | 2 byte | |
| | 25 bytes × 4 = | 100 bytes |
| | | 110 bytes |

Dead Blankets Message

| | | |
|---|---|---|
| MESSAGE TYPE | | 1 byte |
| PRESS | | 1 byte |
| SHIFT | | 1 byte |
| JOB | | 2 byte |
| FORM | | 2 byte |
| RUN | | 1 byte |
| HOURS | | 1 byte |
| MINUTES | | 1 byte |
| SERIAL NUMBER | 5 ASCII | |
| CUT | 3 ASCII | |
| MANUFACTURER CODE 1 | 1 ASCII | |
| MANUFACTURER CODE 2 | 6 ASCII | |
| NEW/USED | 1 ASCII | |
| CHANGE CODE | 1 ASCII | |
| UNDERLAY | 3 ASCII | |
| THICKNESS | 3 ASCII | |
| IMPRESSIONS × 1000 | 2 byte | |
| | 25 bytes × 4 = | 100 bytes max. |
| | | 110 bytes max. |

In reporting dead blankets, only those blanket positions which have been changed are reported. Therefore, the number of dead blanket messages, and the number of blankets reported in the last message, for any given change of blankets, will depend on the number of blankets changed.

Production Order

| | | |
|---|---|---|
| MESSAGE TYPE | | 1 byte |
| PRESS | | 1 byte |
| SHIFT | | 1 byte |
| JOB | | 2 byte |
| FORM | | 2 byte |
| RUN | | 1 byte |
| HOURS | | 1 byte |
| MINUTES | | 1 byte |
| JOB | | 4 ASCII |
| FORM | | 3 ASCII |
| RUN | | 2 ASCII |
| WEB 1 | - MILL | 2 ASCII |
| | - TYPE | 2 ASCII |
| | - WIDTH | 4 ASCII |
| | - WEIGHT | 2 ASCII |
| | - COLOR | 1 ASCII |
| WEB 2 | - MILL | 2 ASCII |
| | - TYPE | 2 ASCII |
| | - WIDTH | 4 ASCII |
| | - WEIGHT | 2 ASCII |
| | - COLOR | 1 ASCII |
| WEB 3 | - MILL | 2 ASCII |
| | - TYPE | 2 ASCII |
| | - WIDTH | 4 ASCII |
| | - WEIGHT | 2 ASCII |
| | - COLOR | 1 ASCII |
| NUMBER OF UNITS | | 1 ASCII |
| NUMBER OF PLATES | | 2 ASCII |
| NUMBER OF FOLDERS | | 2 ASCII |
| FOLD TYPE | | 2 ASCII |
| NUMBER UP | | 1 ASCII |
| QUANTITY | | 7 ASCII |
| QUALITY | | 1 ASCII |
| | | 68 bytes |

Time Synch Message

| | |
|---|---|
| MESSAGE TYPE | 1 byte |
| HOURS | 1 byte |
| MINUTES | 1 byte |
| | 3 bytes |

Makeready Data

| | | |
|---|---|---|
| MESSAGE TYPE | | 1 byte |
| WASHUP STANDARD CONSTANT | | 1 byte |
| BLANKETS STANDARD CONSTANT | | 1 byte |
| PLATES STANDARD CONSTANT | | 1 byte |
| CYLINDERS STANDARD CONSTANT | | 1 byte |
| WEB STANDARD CONSTANT | | 1 byte |
| MAKEREADY WASTE STANDARD CONSTANT | | 2 byte |
| RUN WASTE STANDARD CONSTANT | | 1 byte |
| STANDARD SPEED | | 2 byte |
| JOB | | 4 ASCII |
| FORM | | 3 ASCII |
| RUN | | 2 ASCII |
| WEB 1 | - MILL | 2 ASCII |
| | - TYPE | 2 ASCII |
| | - WIDTH | 4 ASCII |
| | - WEIGHT | 2 ASCII |
| | - COLOR | 1 ASCII |
| WEB 2 | - MILL | 2 ASCII |
| | - TYPE | 2 ASCII |
| | - WIDTH | 4 ASCII |
| | - WEIGHT | 2 ASCII |
| | - COLOR | 1 ASCII |
| WEB 3 | - MILL | 2 ASCII |
| | - TYPE | 2 ASCII |
| | - WIDTH | 4 ASCII |
| | - WEIGHT | 2 ASCII |
| | - COLOR | 1 ASCII |
| NUMBER OF UNITS | | 1 ASCII |
| NUMBER OF PLATES | | 2 ASCII |
| NUMBER OF FOLDERS | | 2 ASCII |
| FOLD TYPE | | 2 ASCII |
| NUMBER UP | | 1 ASCII |
| QUANTITY | | 7 ASCII |
| QUALITY | | 1 ASCII |
| | | 69 bytes |

In some instances the messages themselves will indicate a unit of measurement in which a quantity is being expressed, but in other instances the unit may not be obvious from the message. By way of example, the following are some typical message fields, and the corresponding units of measurement:

| | |
|---|---|
| Time fields | minutes |
| Net count | impressions |
| Waste count | impressions |
| Gross count | impressions |
| Speed | impressions/hour |
| Makeready waste standard constant | impressions/hour |
| Run waste standard constant | percent |
| Plates standard constant | minutes/plate |
| Web standard constant | minutes/web |
| Other standard constant fields | minutes/unit |
| Quantity | impressions |
| Opcode fields | (See opcode menu FIGS. 19 & 20) |

The following data will be accumulated for each interval:
TIME (minutes)
NET (impressions)
WASTE (impressions)
SPEED (impressions/hour)
NET LINEAR FEET 1 & 2 (feet)
GROSS LINEAR FEET 1 & 2 (feet)
TIME is accumulated by incrementing a time count each minute that the interval is active. Other values are calculated at interval end according to these equations:
  Net Linear Feet interval = NET end—NET begin
  WASTE interval = GROSS end—GROSS begin—Net interval
  SPEED interval = ((GROSS end—GROSS begin)/TIME)×60
or
  SPEED run interval = (NET interval/TIME)×60
  Net Linear Feet interval = NLF end—NLF begin
  Gross Linear Feet interval = GLF end—GLF begin
  To enable calculation of the desired data, the PMA hardware provides storage of the following data for an interval:

| | |
|---|---|
| Beginning Opcode | 1 byte |
| Ending Opcode | 1 byte |
| Timer | 2 byte |
| Beginning NLF 1 | 4 byte-scien. |
| Beginning NLF 2 | 4 byte-scien. |
| Beginning GLF 1 | 4 byte-scien. |
| Beginning GLF 2 | 4 byte-scien. |
| Beginning Net | 4 byte-scien. |
| Beginning Gross | 4 byte-scien. |
| | 28 bytes |

By the nature of press operations, and to allow future calculation of intervals not explicitly tracked—such as Printing Waste—three intervals can run concurrently:

| Major Intervals | Minor Intervals | P.M. Interval |
|---|---|---|
| OTHER-WT | | PM |
| MAKEREADY | E1,E2,E3,E4,DT,WT | PM |
| RUN | DT,WT | PM |

The PMA maintains three interval tracking areas—28 bytes × 3 = 84 bytes.

Data on intervals E1, E2, E3, E4, and DT are not sent at interval end as is data for the other intervals. In addition, intervals E1, E2, E3, and E4 may not be continuous, such that the final interval data must be a summation of interval segments data. To accommodate these requirements, the PMA data base provides eight internal save areas patterned after the interval message:

| | |
|---|---|
| Beginning Opcode | 1 byte |
| Ending Opcode | 1 byte |
| Actual Time | 2 byte |
| Standard Time | 2 byte |
| Actual Net | 4 byte-scien. |
| Standard Net | 4 byte-scien. |
| Actual Waste | 4 byte-scien. |
| Standard Waste | 4 byte-scien. |
| Average Speed | 2 byte |
| Actual NLF 1 | 4 byte-scien. |
| Actual NLF 2 | 4 byte-scien. |
| Actual GLF 1 | 4 byte-scien. |
| Actual GLF 2 | 4 byte-scien. |
| | 40 bytes × 8 = 320 bytes |

Intervals tracked:

| | begin | end |
|---|---|---|
| OTHER-WT | E0·C0 | E0·(C0 + C1) |
| MAKEREADY | E0·C1 | E6 + (E0·(C0 + C1) |
| E1 | E1 | E2 + E3 + E4 + E5 |
| E2 | E2 | E1 + E3 + E4 + E5 |
| E3 | E3 | E1 + E2 + E3 + E5 |
| E4 | E4 | E1 + E2 + E3 + E5 |
| RUN | E6 | E0·(C0 + C1) |
| DOWN | E8 + (E0·C2) | depends on state |
| WAIT | E0·C3 | depends on state |
| PM | C3*·(DT + WT) | $\overline{DT} + \overline{WT}$ + C6 |

*including PM OPCODE

There are a number of displays available at the PMA and the REC consoles, and these are listed below, together with appropriate Figure numbers of the drawings, which show the significant ones of the displays. The display menus for each are simply these listings of displays.

| PMA CONSOLE DISPLAY | |
|---|---|
| Input Displays | |
| 1 | Makeready Starup (FIG. 11) |
| 2 | Crew Data (FIG. 10) |
| 3 | Blanket Use Data |
| 4 | PMA Display Menu |
| 5 | Op Code Menu (FIGS. 19 & 20) |
| Status Displays | |
| | Indirect Time |
| | Makeready Time (FIGS. 12,13,14, & 15) |
| | Run Time (FIGS. 16, 17 & 18) |

| REMOTE ENTRY CONSOLE DISPLAYS | |
|---|---|
| 0 | Set Time |
| 1 | REC Display Menu |
| 2 | Production Order (same as FIG. 11 top) |
| 3 | Standards Input |
| 4 | Blanket Use Data |
| 5 | Crew Data (FIG. 10) |
| 6 | Press Status |
| 7 | Alarms Log |
| 8 | Alarms Generation |

System Operation

Figure 6:
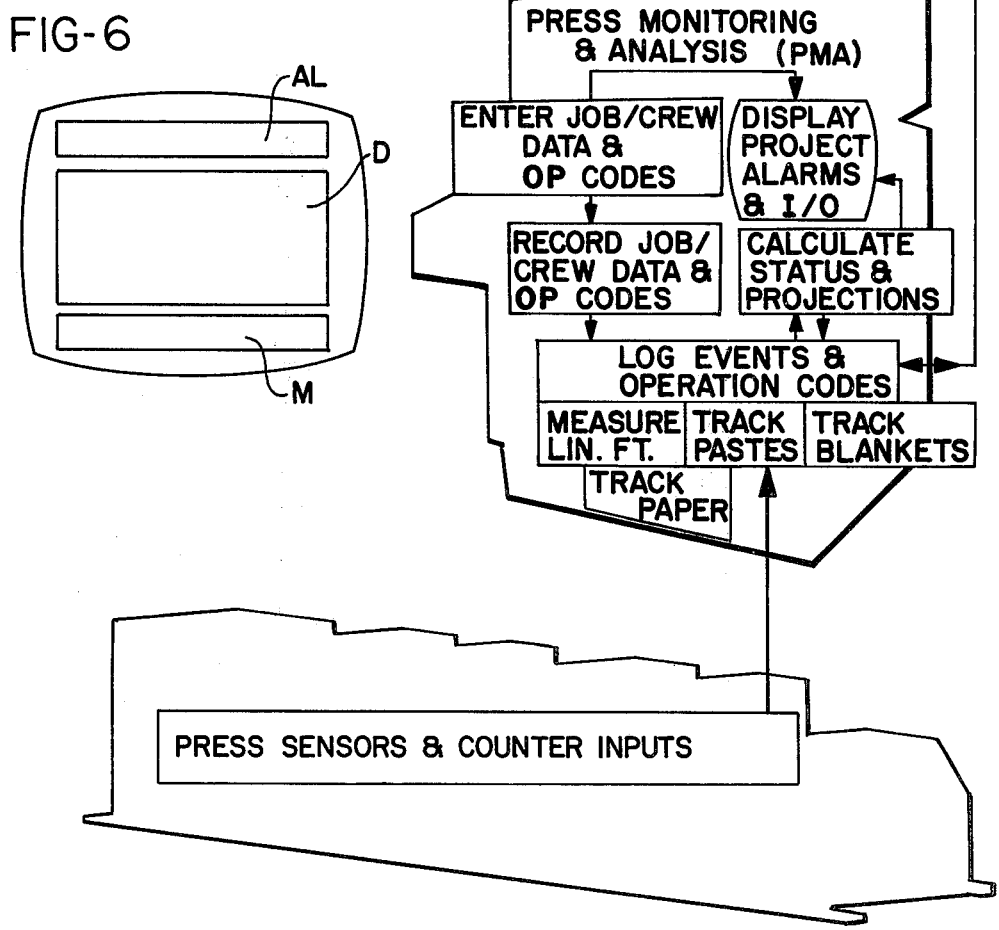
FIG. 6 is a drawing of the PMA video display depicting the manner in which messages, alerts, and display formats are presented to an operator.

A typical operation of the system involves the performance of at least one job by the press, and for purposes of explanation it will be assumed that the job is to begin with a new crew which is coming to work on a shift. FIG. 6 shows the regions on the CRT of the PMA console which are utilized for communication with the press crew, usually the crew chief. The largest center region, designated D is the region in which the various displays appear, such as those shown in FIGS. 12-20. The smaller border region to the top designated AL is used for alarm prompts, and in the preferred embodiment, since a color CRT is used, this region is surrounded by a red rectangle to draw the attention of the operator to the alarm prompt. The region at the bottom designated M, is used for re-minder prompts to the operator, and other instructions during the function of the system, and in the preferred embodiment it is surrounded by a blue border.

Assuming that the system has been started, and time and data has been entered in response to a Time Request Message via the clock and calendar in the REC (Table II), job standards can then be entered via the REC console by a management or supervisory person. The standards are stored in the disc memory and can merely be recalled and displayed at the REC console, or these may be changed if needed. Such standards are used as later explained. The REC to PMA Makeready Data message transfers the data to the PMA memory.

At the beginning of a shift, the Crew Data display (FIG. 10) is called up on the CRT of one or the other console, appearing as a table with spaces to be filled in. An operator at that console enters the necessary data to identify the job. For example, crew data will be input at the PMA during each operating shift, an identification number is provided for each member of the crew, and at appropriate times the entry device is also used to provide to the system the times when each particular member of the crew begins and ends his shift. A Crew LogOn Message is sent to the REC when the entries are completed at the PMA.

A further display (FIG. 11) identifies and calls for information needed in association with makeready startup operations. This for example will include identification of the run and job, the number, types, sizes and other characteristics of webs to be used, the number of active printing units, usually related to the number of colors in a job, the number of plates to be used and any information concerning the folder or its operations. Also to be filled in are the number of units involved as concerned with preparation and washup, washing blankets, changing plates, cleaning cylinders, or leading one or more webs through the press. The REC display for Production Order is identical to the upper half of the PMA Makeready Startup display. Thus an order can be entered at either. It is also possible to have the order filed at the REC disc memory and recalled, in which case a Production Order message would be communicated to the PMA. The press crew chief can call up the completed Production Order to the PMA by entering "DISPLAY 1 ENTER" and fill in the remainder. The system will not proceed until this information is complete. As soon as this information is completed by the entry process, the information is stored in memory via a Production Order message. Productivity calculations are made, using standard run constants which have been previously determined, based upon experience with the press or a like press. These constants are filed at the REC console, and of course are subject to change as more up to date information might be available to the production management office.

When the Production Order data is entered, the PMA computer calls up these constants and uses them to calculate the standard times. Typical constants filed at the REC are K1—Preparation & Washup—Minutes per fountains
K2—Washing Blankets—Minutes per fountains
K3—Changing Plates—Minutes per plate
K4—Cleaning Cylinders & Bearers—Min. per fountain
K5—Leading Web—Minutes per web
K6—Impressions/Hr.—Imp/Hr.
K7—% Running Waste—Waste/Good.

The calculations made at the PMA are
$T_1$—Total Preparation & Wash Time $K1 \times$ No. of fountains
$T_2$—Total Wash Blanket Time $K2 \times$ No. of fountains
$T_3$—Total Changing Plates $K3 \times$ No. of plates
$T_4$—Total Cleaning Cylinders and Bearers $K4 \times$ No. of fountains
$T_5$—Total Leading Webs $K5 \times$ No. of webs
Calculations include
Total Makeready Hours $= T_M = T_1 + T_2 + T_3 + T_4 + T_5$
Standard Makeready Waste $= T_M \times K7$
Standard Running Waste $=$ Print Quantity $\times K7$
Standard Waste $=$ Std. Makeready Waste $+$ Std. Run Waste
Standard Run Hours $=$ Print Quantity $\div K6$ When productivity calculations are completed the Makeready operation proceeds. FIG. 12 shows the Makeready display with only standard and projected makeready bar graphs. This display automatically appears, as soon as Production data is entered, and represents the situation at the beginning of phase I of the makeready period (MR 1). During this time the crew proceeds to hang plates, thread the webs, prepare (but not set) the ink fountains, etc.

The system is monitoring progress during this period, and for every four minutes (one fifteenth of an hour) an Event Message is sent to the REC, and also a graph increment is added where appropriate. As the makeready operation proceeds another bar graph appears on the display, representing accumulated makeready hours. This bar, which grows in length as the makeready operation proceeds represents actual time elapsed from the beginning of phase I makeready, when this display appeared. Also on the display are places for entry for the amount of down time or waiting time for the press, or time required for management functions, and bar graphs showing, individually, accumulated down time, wait time and press management time.

In connection with down time during makeready, the display includes provision for a number of down time operating codes which identify specific types of down time during the makeready process, and also a place to enter wait time and press management operating codes. The system will charge wait time unless an operator intervenes a particular operating code to identify a specific down time operation to which the elapsed time at this point should be allocated. The progress and/or stoppage of normal makeready results in Event messages, including time, operation identifying (OP) code and elapsed time or downtime, being sent regularly to the REC and recorded (filed), and also used to build the display graphs. The various events which lead to different press status are shown in FIG. 21 and can also be noted from Table II, Message Exchange.

When the crew has run some waste, phase II of makeready begins. This is recognized as event E5 (see FIG.

21) and the system then automatically updates the makeready display (FIG. 13), with its accumulated graphs. The state is now MR 2, as shown in FIG. 21. The system, every four minutes calculates makeready projected time and this information is part of the PMA display. When makeready phase I is begun, the projected time is set equal to the standards, since no operations have occurred. Thereafter, the time associated with washing blankets, leading webs, washing up, and changing plates are all accumulated separately. This is accomplished by using the decoded sensor signals to direct clock information into appropriate time stores or registers, where time for the corresponding operation accumulates. In addition to the four operations just mentioned, there is also a register for storing time indicating merely that the operation has stopped. To calculate projected makeready time, the standard time for the particular operation is substituted until the operation is begun. Thereafter, the actual time spent in that operation is added. If an operation is in progress during the four minute update cycle, then the time for the operation is either the accumulated time before that operation, or the standard, whichever is greater. Once an operation is completed, the actual time is used unless that operation begins again. All projections that extend past a shift boundary (e.g. eight hours for a shift) are truncated so that the projected time becomes the time until the end of the shift. The mathematical presentation of this calculation, which is repeated every four minutes is as follows:

| | | |
|---|---|---|
| PrMT | is | Projected Makeready Time |
| WBT | is | Wash Blankets Time |
| CPT | is | Change Plates Time |
| LWT | is | Lead Webs Time |
| WUT | is | Wash Up Time |
| DT | is | Down Time |
| WT | is | Wait Time |
| PM | is | Press Maintenance Time |

Thus, $$PrMT = WBT + CPT + LWT + WUT + DT + WT + PM.$$

As the phase I makeready proceeds, the projected makeready hours bar graph will appear less than the standard makeready hours bar (if the crew is ahead of normal schedule), or equal to standard if the crew is on normal schedule. An over standard situation is described below. If the makeready display remains on the PMA display CRT, the projected makeready hour bar will fluctuate vs. the standard according to the situation.

The system also records a menu of operational (OP) codes and descriptive phrases which the operator can call up on demand should he not have the necessary code memorized at the time it is necessary to enter it at the console for some reason. The menu comprises two displays, FIGS. 19 and 20, which the operator can recall and readily look up all the various identifications for operational codes necessary to allocate particular operations or occurrences within the term of the makeready and run operations.

A typical makeready display is shown in FIG. 13, and includes some downtime and some accumulated waste. It is assumed here that the operator, during phase I makeready, has entered an appropriate OPCODE for the downtime reason (obtained from menu, FIG. 19 or 20, if necessary) and a message has been recorded at the REC. Only the totals are displayed here, not preceding reasons. Waste is represented as one unit (fifteen screen increments) per 4000 impressions.

Figure 14:
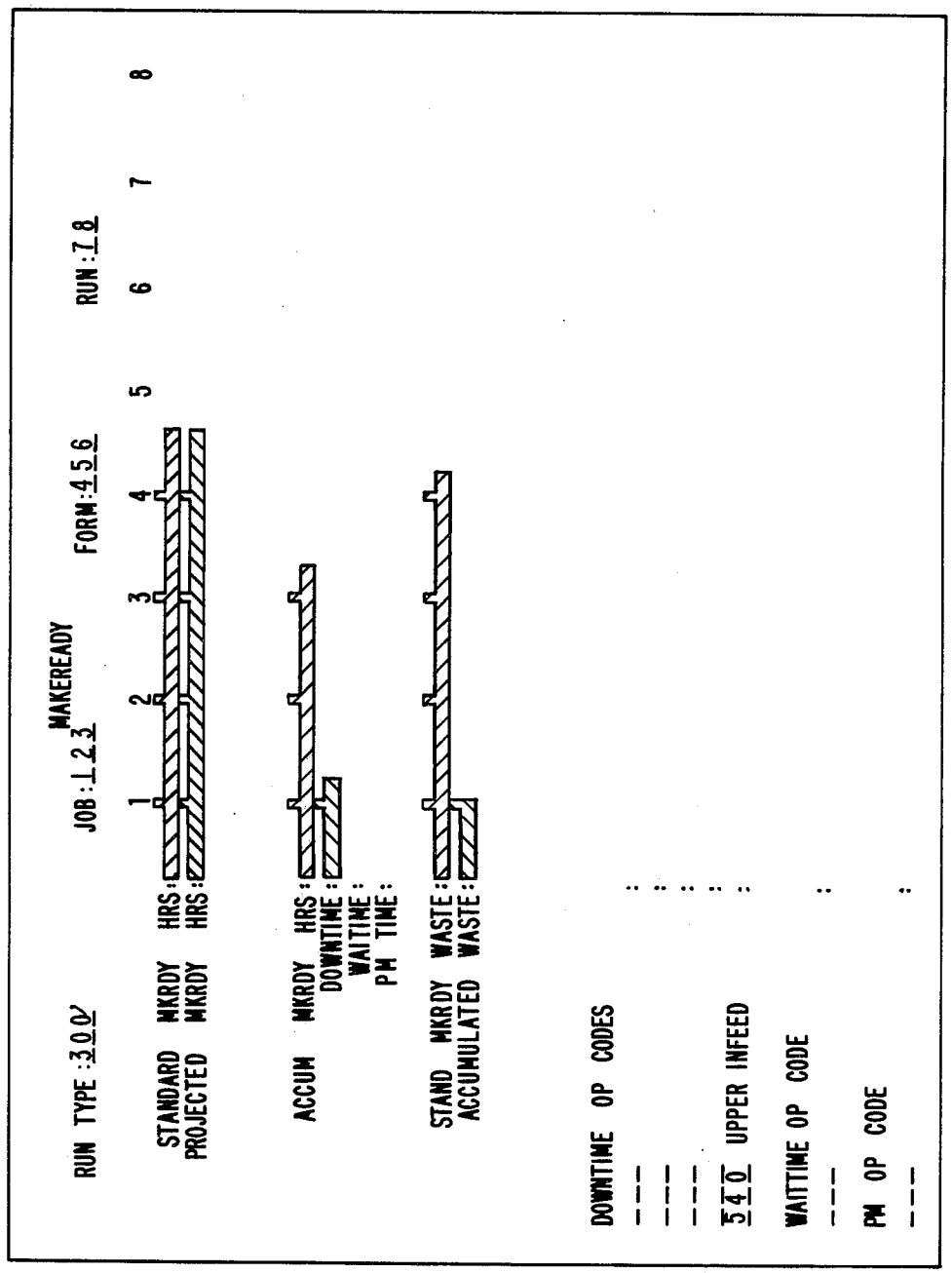

FIG. 14 shows the phase II makeready display at a later time. Some more downtime has occurred and the operator has determined it resulted from a web break at the upper infeed. He has entered the OPCODE 540. The bar after this code was deleted once the press again was running and the downtime increased accordingly. The downtime event message has been reported to the REC file. It should also be noted that accumulated waste now equals 4000 impressions, almost one-fourth of the standard for makeready waste.

Figure 15:
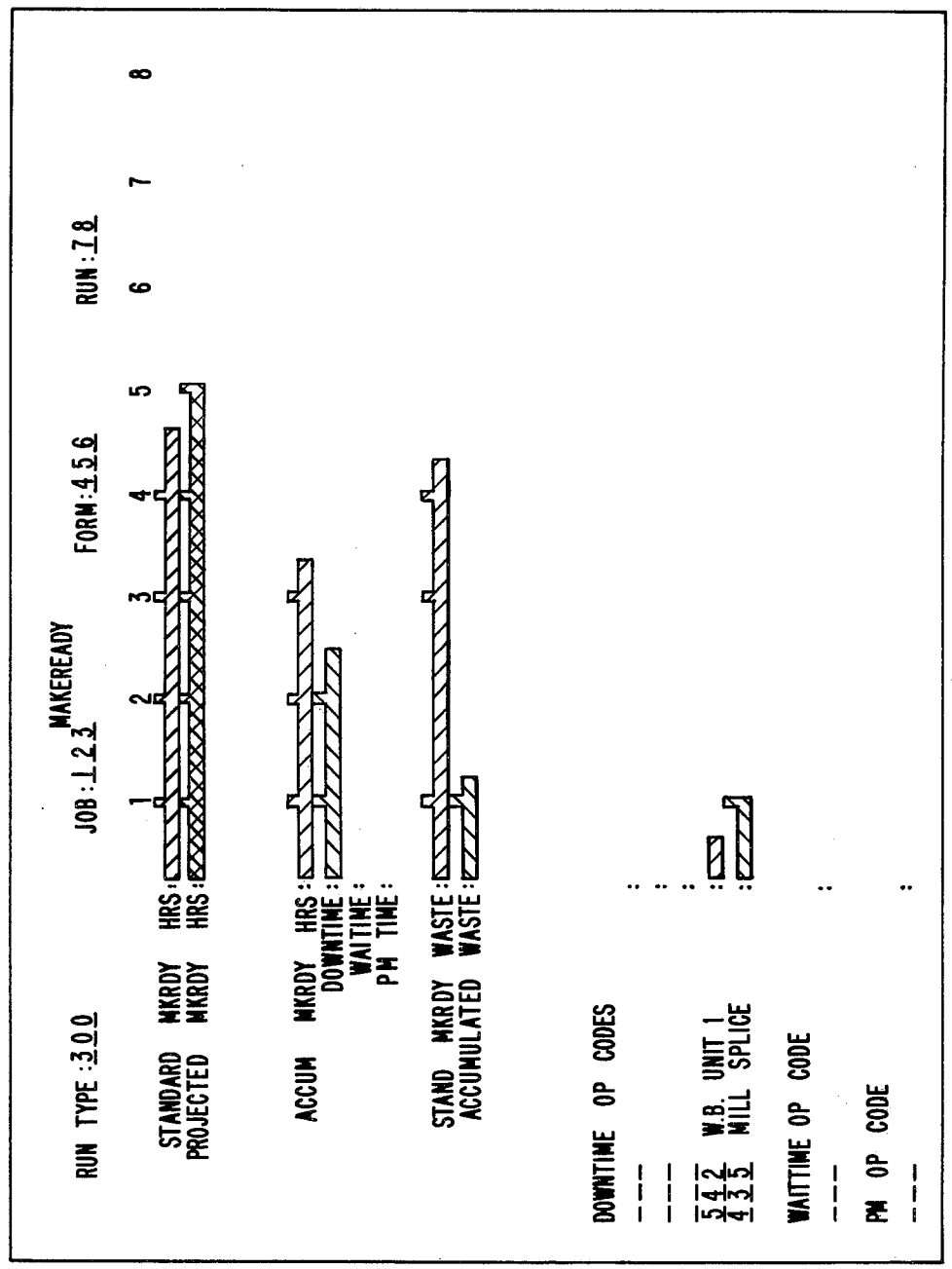

FIG. 15 shows the Makeready display later in phase II. A further downtime has been encountered which was detected and automatically entered as due to a web break in printing unit one, OPCODE 542; FIG. 21, E8 transition from MR 2 to MR 2 DOWN. After about thirty minutes this was manually terminated by the operator, who determined the actual cause of downtime was due to a mill splice break. He has therefore entered OPCODE 435, and about one hour of downtime has accumulated for that reason.

At this point it should be noted that the latest calculation of projected makeready hours now exceeds the standard. The bar graph for projected makeready hours has therefore changed color, and it is expected that the makeready mode will require more than standard time before it is completed.

It should also be noted that wait times and press management (PM) times are always manually entered OPCODES. When these are ended, the corresponding totaled bar graphs remain on the display until the makeready mode is complete.

The operator, or the production manager if he calls up the Makeready display to the REC, can thus be continuously informed as to the progress of the makeready operation, and if there are any unexpected delays, they will likewise be informed as to the time and nature of these delays.

Once the makeready process is completed, including leading webs and print registration, and the press is running, the operator will press the GOOD button on the PMA console to indicate that a "good count" has begun. This also indicates that the output of the folders is to be saved from that time on during the run, unless some intervening condition produces waste. When the operator thus signals the beginning of the good count, the PMA display automatically changes to the Run Status display (FIG. 16). It includes bar graphs of standard run hours, standard run waste, and a gradually increasing graph showing actual run hours. Additional graph bars can show down time hours, wait time hours, or management time hours during the term of the run. In the event of down time, wait time, or management time the operator can enter codes identifying the particular operation or occurrence from which the stoppage resulted, and this is automatically recorded at the REC along with the date and time of day, so that the occurrence, nature, and length of time of each of these nonproductive periods is recorded (filed).

Similar to the makeready mode, projected run time is calculated and the "Projected Run Hours" display is updated every four minutes. This calculation is based on the difference between the target good count (QUANTITY) entered during makeready startup (FIG. 11) and the present good count. Initially the projection is set equal to the standard.

As the run progresses, an effective printing rate (speed) is calculated every four minutes.

Effective Printing Rate=(Number of Good Impressions)/(Accumulated Run Time)

Then the projected run time (PRT) is calculated as

PRT=(Target Good Count-Present Good Count)-/(Effective Printing Rate.)

During down, wait, or press maintenance time this calculation is not made. The projection is simply increased by four minute increments for the duration of the non-running period. Calculated projection begins again when the good event E6 is detected.

Since presses of this type usually operate from a reel which allows the web from a new roll to be pasted to the end of the web from an exhausted roll (as above described), the system also provides for an accounting of waste resulting from the passage of the paste through the press. To accomplish this, the good counter, having been started by the operator as previously mentioned, is automatically turned off once a predetermined number of gross counts occur after sensing the paste. It is then up to the operator again to signal commencement of a good count as soon as the paste has cleared to the point that and good prints are again available.

Figure 17:
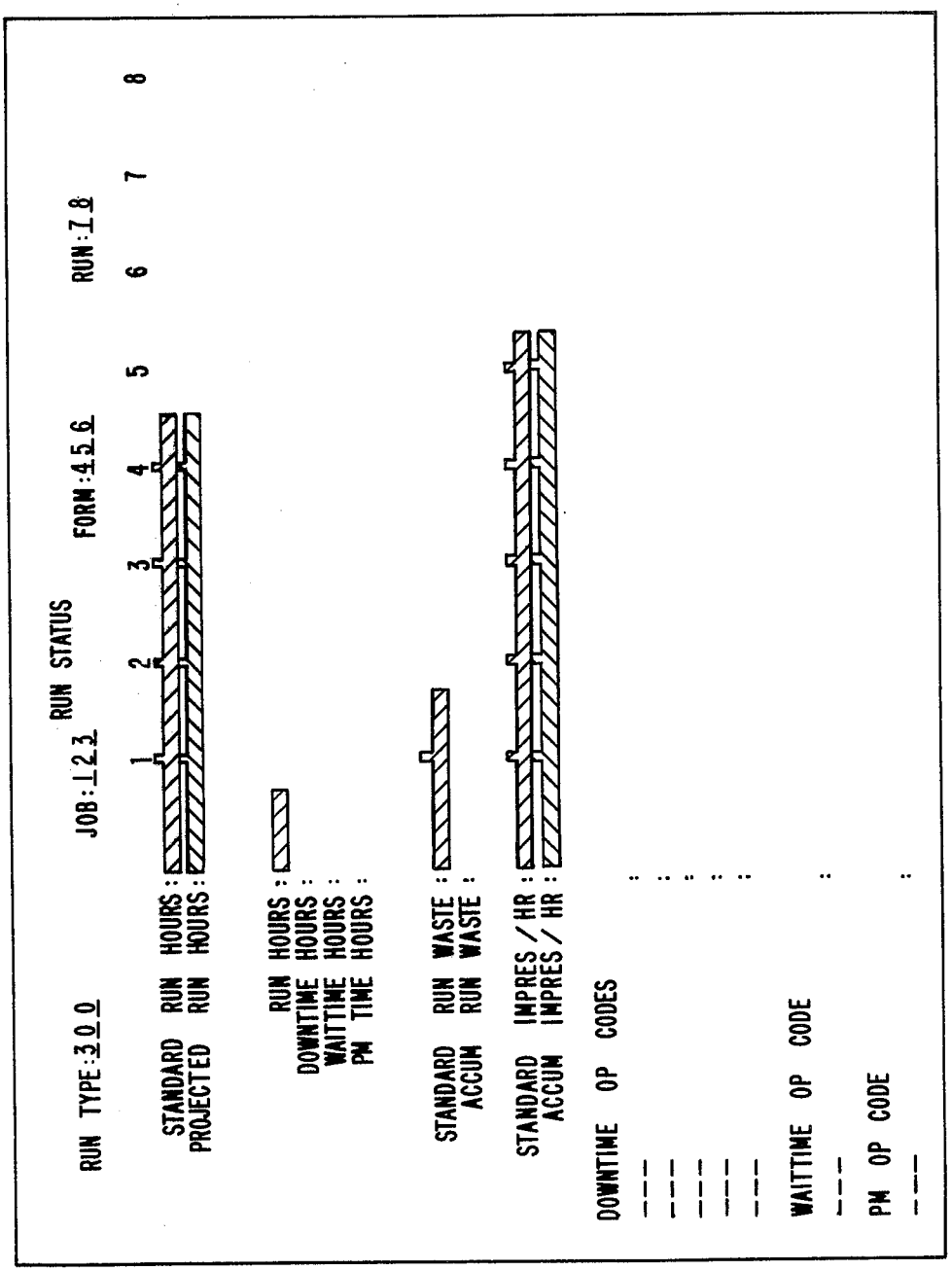

FIG. 17 shows the Run Status display after the run has progressed at a normal (standard) rate for about forty-five minutes. The projected run hours are equal to the standard. The standard run waste has been displayed, having been calculated from the standards information on file at the REC. Accumulated impression per hour (the Effective Printing Rate) is within standard, and as yet there has not been any run waste.

Figure 18:
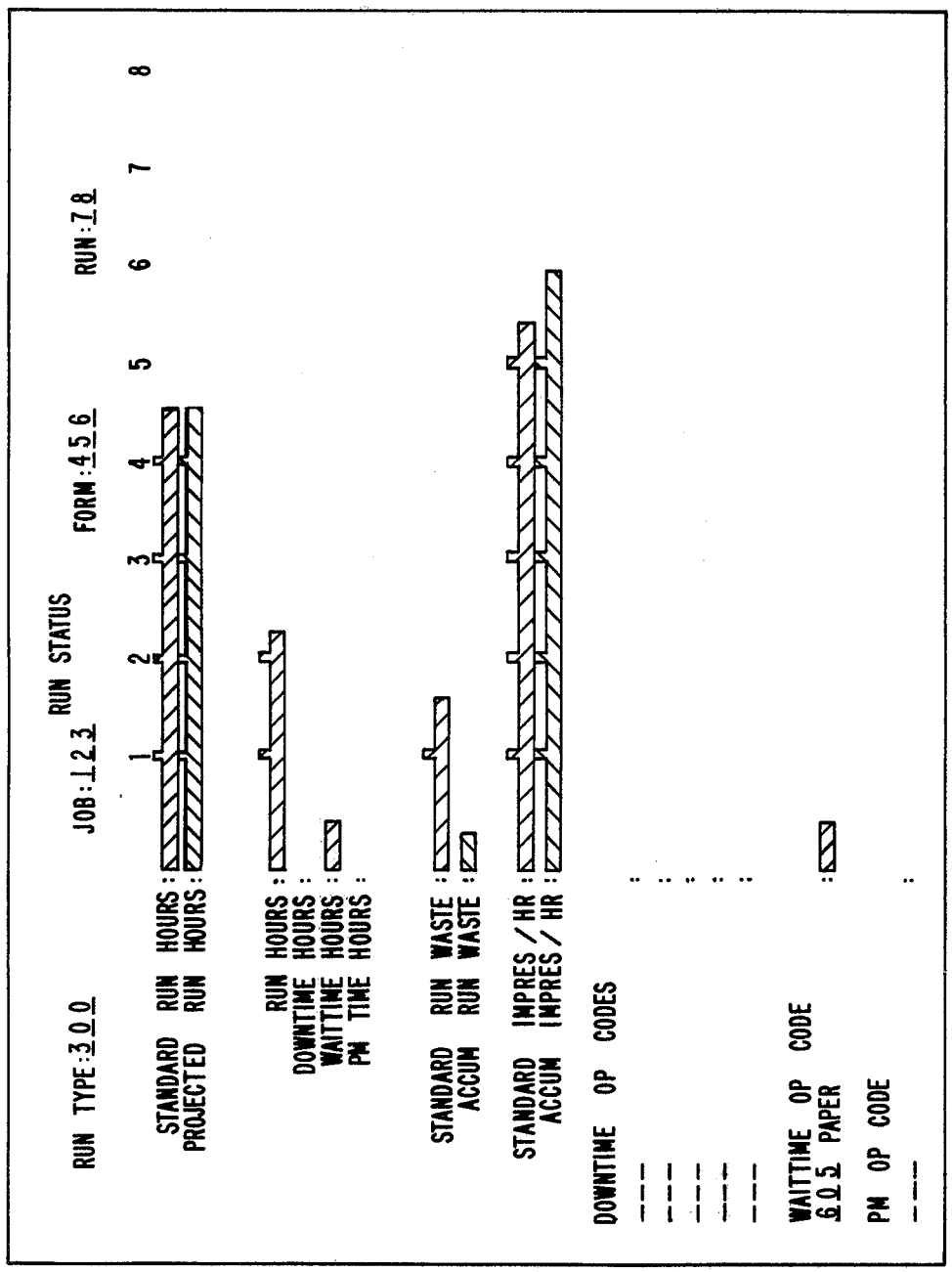

FIG. 18 shows the display later on, after a little more than two hours run time. A wait is occurring for paper (OPCODE 605), run waste is still below standard, but the accumulated impressions per hour is now just under 24,000/hr., in excess of standard, and the projected run hours now exceeds standard, hence the bar graph for projected run hours has changed color.

Referring again to FIG. 21, the diagram explains the overall press state sequences with event codes (E0—E9) and keyboard derived events (C0—C7), referencing the press modes or states. These are Makeready (MR1 and MR2) and Run. Thus the system monitors, prompts, creates and updates displays, and otherwise assists the operating crew, while at the same time providing management information both dynamically and by building operations files which can be used to prepare various hard copy reports. Samples of two such reports are:

(a) Press Run Data Report-table III, and
(b) Daily Production Report-table IV.

While the form of apparatus herein described constitutes a preferred embodiment of this invention, it is to be understood that the invention is not limited to this precise form of apparatus, and that changes may be made therein without departing from the scope of the invention which is defined in the appended claims.

TABLE I

| PRESS SENSOR BIT ASSIGNMENTS | |
|---|---|
| 0-WEB BREAK UPPER INFEED | 31-HIGH TEMP. BRIGDE AIR |
| 1-WEB BREAK LOWER INFEED | 32-HIGH TEMP CHILL WATER |
| 2-WEB BREAK UNIT 1 | 33-PHASE LOSS |
| 3-WEB BREAK UNIT 2 | 34-HIGH PRESSURE AIR |
| 4-WEB BREAK UNIT 3 | 35-GOOD COUNT |
| 5-WEB BREAK UNIT 4 | 48-CRUN (CONTINUOUS RUN) |
| 6-WEB BREAK UNIT 5 | 49-FOLDER DISENGAGED |
| 7-WEB BREAK UNIT 6 | 50-20 SPEED |
| 8-WEB BREAK UPPER DRYER | 51-IMPRESSION ON UNIT 1 |
| 9-WEB BREAK SPARE | 52-IMPRESSION ON UNIT 2 |
| 10-WEB BREAK UPPER CHILL | 53-IMPRESSION ON UNIT 3 |
| 11-WEB BREAK LOWER CHILL | 54-IMPRESSION ON UNIT 4 |
| 12-WEB BREAK SPARE | 55-IMPRESSION ON UNIT 5 |
| 13-WEB BREAK SPARE | 56-IMPRESSION ON UNIT 6 |
| 14-WEB BREAK SPARE | 57-35 SPEED |
| 15-WEB BREAK SPARE | 58-FASTER |
| 16-FOLDER JAMS | 59-SLOWER |
| 17-UPPER WEB AIR | 60-REVERSE |
| 18-LOWER WEB AIR | 61-INCH |
| 19-NO OIL UNIT 1 | 62-READY |
| 20-NO OIL UNIT 2 | 63-SAFE |
| 21-NO OIL UNIT 3 | 64-PASTE 1 |
| 22-NO OIL UNIT 4 | 65-PASTE 2 |
| 23-NO OIL UNIT 5 | 66-RED STOP BUTTON |
| 24-NO OIL UNIT 6 | 67-DRIVE FAIL |
| 25-NO OIL FOLDER | 68-POWER ON |
| 26-NO OIL INFEED | 69-DRYER FAIL |
| 27-NO OIL CHILL | 70-SPARE |
| 28-HIGH TEMP. DRIVE MOTOR | 71-SPARE |
| 29-HIGH TEMP. TRANSFORMER | |
| 30-HIGH TEMP. SCR BRIDGE | |

TABLE II

| MESSAGE EXCHANGE | |
|---|---|
| PMA | REC |
| at power up, TIME REQUEST → | |
| | ← TIME SYNC in response |
| | ← TIME SYNC hourly |
| an operator entry of data PRODUCTION ORDER → | |
| on any blanket change, all segments CURRENT | |
| BLANKETS → | |
| on any blankets change, segments as needed, DEAD BLANKETS → | |
| every 4 minutes, PRESS STATUS → | |
| on occurrence of press events, as required, | |
| EVENT → | |
| (1)sent at first E5, one each for E1, E2, E3 and E4; | |
| (2)at end of each PM interval; | |
| (3)at end of each WAIT interval; | |
| (4)at end of MakeReady and end of Run, one for each DOWN interval saved; | |
| (5)one for oldest DOWN interval when DOWN save area overflows | |

TABLE II-continued

MESSAGE EXCHANGE

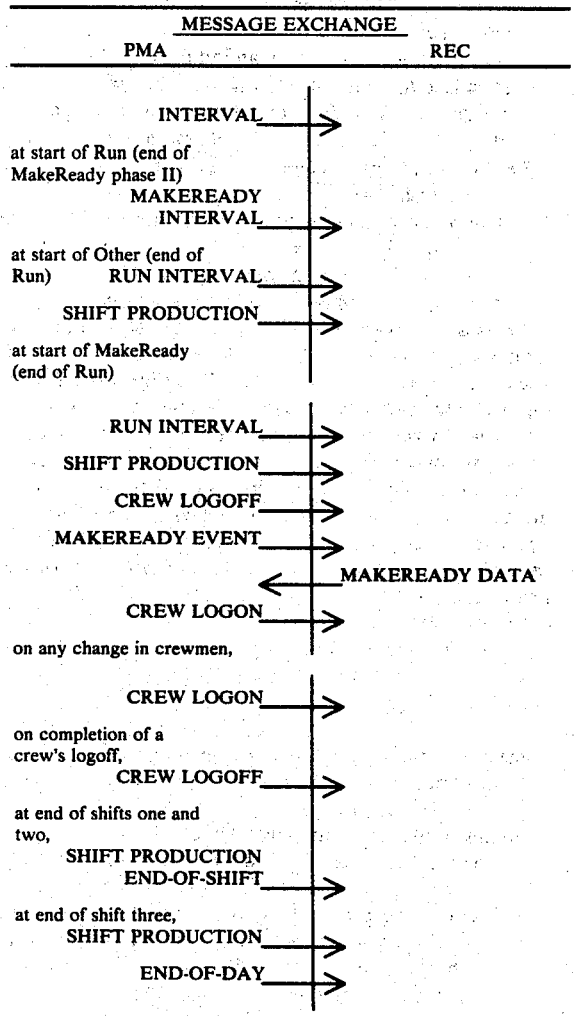

PMA             REC

- INTERVAL → at start of Run (end of MakeReady phase II)
- MAKEREADY INTERVAL → at start of Other (end of Run)
- RUN INTERVAL →
- SHIFT PRODUCTION → at start of MakeReady (end of Run)
- RUN INTERVAL →
- SHIFT PRODUCTION →
- CREW LOGOFF →
- MAKEREADY EVENT →
- ← MAKEREADY DATA
- CREW LOGON → on any change in crewmen,
- CREW LOGON → on completion of a crew's logoff,
- CREW LOGOFF →
- at end of shifts one and two, SHIFT PRODUCTION END-OF-SHIFT →
- at end of shift three, SHIFT PRODUCTION →
- END-OF-DAY →

TABLE III

PRESS 11 RUN DATA REPORT
TIME: 14:05 DATE: 07/16/79
JOB 4097 FORM 256 RUN 10

| EVENT | TIME | HRS. | SPEED | NET CNT | ST NET CNT | WASTE | STD. WASTE | LIN FT 1 | LIN FT 2 | SHIFT |
|---|---|---|---|---|---|---|---|---|---|---|
| 300-ORIG MKRDY | 07:42 | 2.1 | 464 | 0 | 0 | 4125 | 5000 | 7821 | 7892 | 1 |
| 350-RUN | 09:48 | 1.2 | 932 | 34293 | 34000 | 102 | 204 | 18669 | 18672 | 1 |
| 431-W/B HOLE | 11:00 | 0.3 | 374 | 0 | 0 | 432 | 350 | 819 | 832 | 1 |
| 350-RUN | 11:18 | 2.7 | 964 | 82150 | 83314 | 224 | 260 | 43450 | 43451 | 1 |
| 401-PACK/BLKET | 14:00 | 0.4 | 291 | 0 | 0 | 351 | 300 | 185 | 187 | 1 |
| 607-WAIT-REPLATE | 14:24 | 0.3 | 0 | 0 | 0 | 0 | 0 | 0 | 0 | 1 |
| 404-REPLATE-CRK | 14:42 | 0.4 | 396 | 0 | 0 | 415 | 325 | 218 | 221 | 1 |
| 350-RUN | 15:06 | 0.6 | 975 | 18475 | 18550 | 58 | 43 | 109 | 110 | 1 |
| 998-END SHIFT | 15:42 | | | | | | | | | |

TABLE IV

DAILY PRODUCTION REPORT
TIME: 14.08 DATE: 07/16/79

| PRESS | NET COUNT | % DEV | WASTE COUNT | % DEV |
|---|---|---|---|---|
| 11 | 756824 | +0.2 | 31848 | −16.1 |
| TOTALS | 756824 | +0.2 | 31848 | −16.1 |

What is claimed is:

1. A management system for a web processing machine such as a printing press having a web material supply, a plurality of devices for acting repetitively on material drawn from the supply, delivery mechanism receiving the processed material, a drive for said machine, and a plurality of detectors on said machine operable to indicate various occurrences during use of the machine such as correct presence and passage of material, engagement of the drive, on-off impression of the devices, and/or malfunctions or jams in the delivery mechanism;

a control console including a data output device and a data entry device,
a memory storing information to be used during processing of a job on the machine,
an electronic processor,
decoding means receiving inputs from said detectors and providing machine event outputs to said processor,
said processor operating to interrogate said machine event outputs and to provide update operating information on said data output device as the machine is operated.

2. A system as defined in claim 1, wherein said data output device is an alphanumeric/graphic display including numerical displays for machine speed, and for gross count and good count of machine output.

3. A system as defined in claim 2, wherein said alphanumeric/graphic display is a CRT.

4. A system as defined in claim 1, wherein said data input device is a keyboard.

5. A system as defined in claims 1, 2, 3, or 4 wherein said memory includes stored incomplete tables of information arranged for successive display to prompt entry via said data entry device of information required to identify a job.

6. A system as defined in claims 1, 2, 3 or 4 wherein said memory includes stored display information arranged for display to prompt an operator to enter via said data entry device operation data to identify occurrences within a job.

7. A system as defined in claims 1, 2, 3, or 4 wherein said memory includes standard information for use in calculating standard times to accomplish different functions of a job, said processor receiving variable input data for a specific job as entered via said data entry device and operating with said standards information to calculate the time standards for the specific job,
and said processor operating to supply such time standards to said data output device for display to the operator.

8. A system as defined in claims 1, 2, or 3 including means providing to said data output device time standards information for a specific job, said data output device being arranged to display said time standards information and said operating information in a comparative format to an operator.

9. A system as defined in claim 8, said data output device including means to warn an operator that said operation information indicates excess time spent over the time standards information.

10. A system as defined in claims 1, 2, 3 or 4, wherein said machine is a printing press, including counter means operatively associated with the press and providing a count of the number of impressions and the number of good impressions, means connecting said counter means to said processor to provide impression data, and said processor operating to calculate from the impression data the amount of waste resulting during a predetermined portion or all of a job run on the press.

11. A system as defined in claim 10, including tachometer means driven from said press and operative to provide press speed data, means connecting said tachometer means to said processing means, and said processor operating to calculate productivity of the press in terms of good impressions per unit time.

12. A system as defined in claim 11, wherein said counter means and said tachometer means are connected to drive said numerical displays.

13. A system as defined in claims 1, 2, 3, or 4, including a clock providing ongoing time data to said processor, said processor operating upon said time data and said event outputs from said decoding means to provide time related messages indicating the progress of the machine and reasons for delays in such progress.

14. A system as defined in claim 13, including said processor operating to communicate to said memory said time related messages and to calculate therefrom the time lost in machine use as a function of the detected events.

15. A system as defined in claim 13 wherein said memory includes stored display information requiring completion by an operator to log on and/or log off the machine crew via said data entry device, said processor receiving the crew information from said data entry device and providing messages to said memory for building a file of crew information.

16. A system as defined in claim 13 wherein said machine is a printing press, and said memory includes stored blanket use data information to be updated by an operator via said data entry device, said processor receiving the blanket data from said data entry device and providing messages to said memory for building a file of blanket use data.

17. In combination with a web processing machine operable in makeready and operating modes and subject to delays in either mode, a system including means for monitoring the progress of the operation during each of the modes and providing the first data indicative thereof in first and second parts corresponding to the two modes, means for providing second data indicative of predicted standard times and/or rates, display means responsive to said first and second data and operative to display an indication of a progress standard for each mode during a specified job and to display an indication of the actual progress of the machine as each mode of operation continues.

18. The combination defined in claim 17, wherein said monitoring means includes means for sensing various operator related functions of the machine, and means responsive to said sensing means for providing data representative of time periods of the operator related functions.

19. In a web printing press including a web supply for mounting at least one roll of web material and for withdrawing the material from the roll, a plurality of printing units through which the web is guided and at which different operations are performed on the web, a drive providing motive power to said printing units, delivery mechanism receiving the web material from the printing units, and a plurality of detectors operable to indicate the functioning status of the drive, the web supply, the delivery mechanism, and certain components of said printing units, during the makeready mode and the run mode of a job;

the improvement comprising a control station including a data output device and a data entry device, a clock, memory means for storing event messages in time sequence as the press is made ready for and then runs a designated job, means connected to said detectors for providing event data indicative of the status of one or more of said detectors, an electronic processor having inputs from said data entry device, said clock, and said event data means, and having outputs to said data output device and to said recording means, said processor including means for processing said event data into time related event messages, and means operating said processor in response to manual data entry on said data entry device and to said event data to cause recording in said recording means of the operator entered information and of accumulated event messages as the press is prepared for and performs a designated job.

20. The improvement in a web printing press as defined in claim 19, including a counter arranged to count impressions made during the run mode of the job, and an output from said counter to said processor providing a further progress input to said processor.

21. The improvement in a web printing press as defined in claims 19 or 20, including means in said processor arranged to drive said data output device to display elapsed time of the job separately during the makeready and run modes.

22. In combination with a web processing machine operable in a production mode and a makeready mode during the course of a job, an information system comprising:

data input means, means coupled to said data input means for providing, prior to operation of the machine in a production mode, first information signals representative of the predicted run time of a job as a function of input data including machine speed and impression quantity data, means responsive to operation of the machine in non-print mode for providing second information signals representative of delay times, and means for recording to said first and second information signals for providing output data representative of the actual time to perform a job and identifying reasons for delay.

23. In combination with a web processing machine operable in a productive makeready mode and at least one non-productive mode during the course of a makeready operation, an information system comprising:

data input means, means coupled to said data input means for providing, prior to operation of the machine in a makeready mode, first information signals representative of the predicted makeready time for a makeready operation as a function of input data including number of machine units to be prepared, means responsive to operation of the machine in a non-productive mode for providing, during the course of a makeready operation, second signals representative of a revised makeready time as a function of said first information signals and further information signals representative of delay time, and means responsive to said information signals for providing output data representative of the revised makeready time relative to the predicted makeready time within a predetermined time interval.

24. In a web processing machine including a supply means for mounting at least one roll of web material and for withdrawing the material from the roll, a plurality of work stations through which the web is guided and at which different operations are performed on the web, a drive providing motive power to said work stations, and delivery mechanism receiving the web material from the work stations, the improvement comprising a control console including a data output device and a data entry device a memory storing a plurality of display formats at least some of which may be completed by an operator in assemblying information pertaining to a job to be performed on the machine, an electronic processor having inputs and outputs from and to said data entry device and said memory, said processor operating in response to data input by an operator on said data entry device to cause display of the stored display formats by the data output device and to cause recording in said memory of the operator entered information added to said formats, and means causing the calculated job times or rates to be transferred to a display format and displayed therewith at the data output device.

25. The improvement in a web processing machine as defined in claim 24, including sensors on said machine monitoring the function of the different said work stations, means connected to said sensors and responsive to the condition of one or more of said sensors to generate event messages related to the job progress of said machine, and means operative to add to at least some of said display formats information derived from said event messages.

26. The improvement in a web processing machine as defined in claim 25, including means responsive to the condition of one or more of said sensors to generate update information related to the time progress performance of said machine, and means operative to compare the update information with the job times or rates on said data output device.

27. In a web processing machine including a supply means for receiving at least one roll of web material and for withdrawing the material from the roll, a plurality of work stations through which the web is guided and at which different operations are performed on the web, a drive providing motive power to said work stations, and delivery mechanism receiving the web material from the work stations, said machine being operable in a makeready mode and a production mode in the course of performing a job;

the improvement comprising a control console located at said machine and including a data output device and a data entry device, a memory storing a plurality of display formats at least some of which are to be completed by an operator in assemblying information pertaining to a job to be performed on the machine, an electronic processor having inputs and outputs from and to said data entry device and said memory, said processor operating at the beginning of a job in response to an initial data input by an operator on said data entry device to cause successive displays of the stored display formats by the data output device and to cause recording in said memory of the operator entered information added to said display formats, means on said machine operable to detect the number of operations performed at one of said work stations and to produce a corresponding count output, means responsive to operator entries on said data entry device during either of said modes for entering into said memory information identifying a reason for stopping of the machine, and means responsive to an operator entry on said data entry device, signifying the commencing of production of good product, for entering subsequent good count output into said memory distinct from the preceding count output.

28. A web processing machine as defined in claim 27, wherein said processor includes means operative upon the completion of a job to compile a report including the operator entered information, the good count, and the time elapsed during each mode.

29. A web processing machine as defined in claim 28, including printer means operable to produce a job report record upon completion of the compiled report.

30. A web processing machine as defined in claim 28, including a memory connected to receive and to file the compiled job report from said processor.

* * * * *